(12) United States Patent
Aoyama et al.

(10) Patent No.: US 9,925,951 B2
(45) Date of Patent: Mar. 27, 2018

(54) ACTUATOR

(71) Applicant: TOYODA GOSEI CO., LTD., Kiyosu-shi, Aichi-ken (JP)

(72) Inventors: Joji Aoyama, Kiyosu (JP); Hisashi Takaya, Kiyosu (JP); Takashi Sasaki, Kiyosu (JP); Takaki Fukuyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/450,186

(22) Filed: Mar. 6, 2017

(65) Prior Publication Data

US 2017/0282849 A1  Oct. 5, 2017

(30) Foreign Application Priority Data

Mar. 30, 2016  (JP) .................................. 2016-068880

(51) Int. Cl.
*B60R 21/38* (2011.01)

(52) U.S. Cl.
CPC .................................... *B60R 21/38* (2013.01)

(58) Field of Classification Search
CPC ..................................................... B60R 21/38
See application file for complete search history.

(56) References Cited

U.S. PATENT DOCUMENTS

| 7,374,008 | B1* | 5/2008 | Neal ........................ | B60R 21/38 |
| | | | | 180/274 |
| 8,517,419 | B2* | 8/2013 | Debler ................ | B60R 21/2338 |
| | | | | 102/356 |
| 9,340,467 | B2* | 5/2016 | Aoyama ................... | C06D 5/00 |
| 9,573,560 | B1* | 2/2017 | Narita ...................... | B60R 21/38 |
| 9,751,493 | B2* | 9/2017 | Narita ...................... | B60R 21/38 |
| 9,764,711 | B2* | 9/2017 | Narita ..................... | B62D 25/10 |
| 2006/0054016 | A1* | 3/2006 | Davies ............... | F15L 315/1409 |
| | | | | 92/109 |
| 2006/0118348 | A1* | 6/2006 | Haglund ................. | B60R 21/38 |
| | | | | 180/274 |

(Continued)

FOREIGN PATENT DOCUMENTS

| DE | 10355444 B4 * | 10/2007 | ............. B60R 21/38 |
| DE | 102007041555 A1 * | 3/2009 | ............. B60R 21/38 |

(Continued)

*Primary Examiner* — Nicole T Verley
(74) *Attorney, Agent, or Firm* — Posz Law Group, PLC

(57) ABSTRACT

An actuator includes a housing section that houses a driving source and is mountable on a first mounting region and a deploying section that is mountable on a second mounting region and deployable with a driving force of the driving source. The housing section includes a case of metal and a securing member supporting the driving source and secured to the case inside the case. A mounting hole is formed through the case and securing member for receiving a pivot member connected to the first mounting region. A fixing hole is formed through the case and the securing member at a different position from the mounting hole for receiving a fixing member that fixes the securing member to the case. An inner circumferential plane of the mounting hole of the case is in contact with the pivot member on the region disposed towards a deploying direction of the deploying section.

7 Claims, 14 Drawing Sheets

(56) References Cited

U.S. PATENT DOCUMENTS

| | | | | |
|---|---|---|---|---|
| 2006/0175844 A1* | 8/2006 | Neal | | B60R 21/38 292/340 |
| 2006/0213709 A1* | 9/2006 | Yamaguchi | | B60R 21/38 180/69.21 |
| 2007/0222198 A1* | 9/2007 | Green | | B60R 21/02 280/753 |
| 2008/0093150 A1* | 4/2008 | Schramm | | B60R 21/0134 180/274 |
| 2008/0136140 A1* | 6/2008 | Karlsson | | B60R 21/38 280/727 |
| 2008/0189015 A1* | 8/2008 | Borg | | B60R 21/38 701/45 |
| 2009/0072587 A1* | 3/2009 | Inomata | | B60R 21/38 296/193.11 |
| 2009/0084620 A1* | 4/2009 | Matsuura | | B60R 21/02 180/69.2 |
| 2009/0229485 A1* | 9/2009 | Parks | | B60R 21/34 102/530 |
| 2015/0048651 A1* | 2/2015 | Schabenberger | | B60R 21/38 296/187.04 |
| 2015/0060180 A1* | 3/2015 | Yang | | B60R 21/38 180/274 |
| 2015/0183693 A1* | 7/2015 | Aoyama | | C06D 5/00 102/530 |
| 2015/0211265 A1* | 7/2015 | Uyanik | | E05L 385/045 292/195 |
| 2016/0339963 A1* | 11/2016 | Inoue | | B62D 25/12 |
| 2017/0050610 A1* | 2/2017 | Narita | | B60R 21/38 |
| 2017/0057457 A1* | 3/2017 | Narita | | B60R 21/38 |
| 2017/0136985 A1* | 5/2017 | Narita | | B62D 25/10 |

FOREIGN PATENT DOCUMENTS

| | | | | |
|---|---|---|---|---|
| DE | 102007056277 A1 | * | 6/2009 | ............ B60R 21/38 |
| DE | 102009006451 A1 | * | 7/2010 | ............ B60R 21/38 |
| DE | 202013101518 U1 | * | 4/2013 | ............ B60R 21/38 |
| DE | 202014101141 U1 | * | 4/2014 | ............ B60R 21/38 |
| DE | 10343106 B4 | * | 8/2015 | ............ B60R 21/38 |
| DE | 102015100627 A1 | * | 8/2015 | ............ B60R 21/38 |
| DE | 202015006895 U1 | * | 11/2015 | ............ B60R 21/38 |
| DE | 102015111801 A1 | * | 1/2016 | ............ B60R 21/38 |
| DE | 102014223796 A1 | * | 5/2016 | ............ B60R 21/38 |
| DE | 102015120287 A1 | * | 5/2017 | ............ B60R 21/38 |
| EP | 1880907 A1 | | 1/2008 | |
| GB | 2432399 A | * | 5/2007 | ........ B60N 2/42763 |
| JP | 2015-123868 A | | 7/2015 | |
| WO | WO-2011162675 A1 | * | 12/2011 | ............ B60R 21/38 |
| WO | WO-2012144940 A1 | * | 10/2012 | ............ B60R 21/38 |
| WO | WO-2015172120 A1 | * | 11/2015 | ........ F15B 15/1428 |
| WO | WO-2016162317 A1 | * | 10/2016 | ............ B60R 21/38 |

* cited by examiner

Fig. 2
(A)
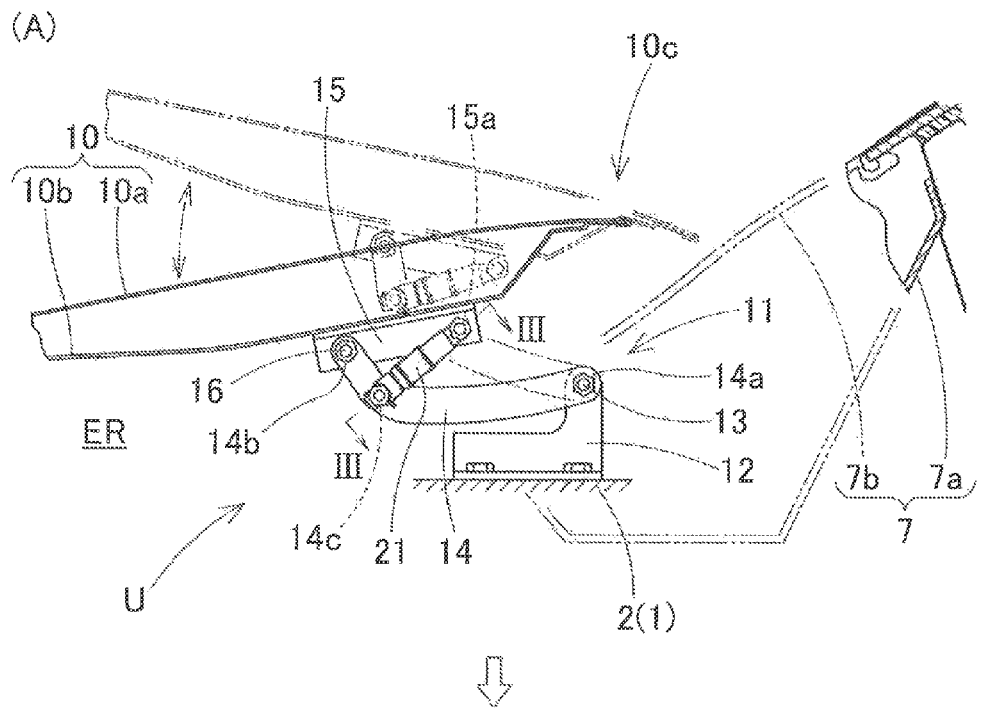
(B)
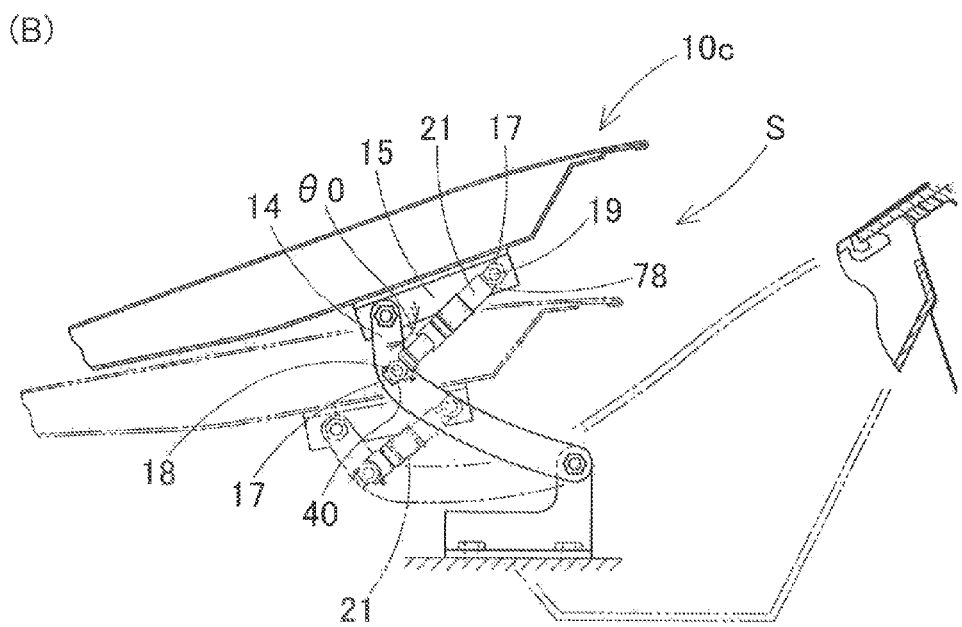

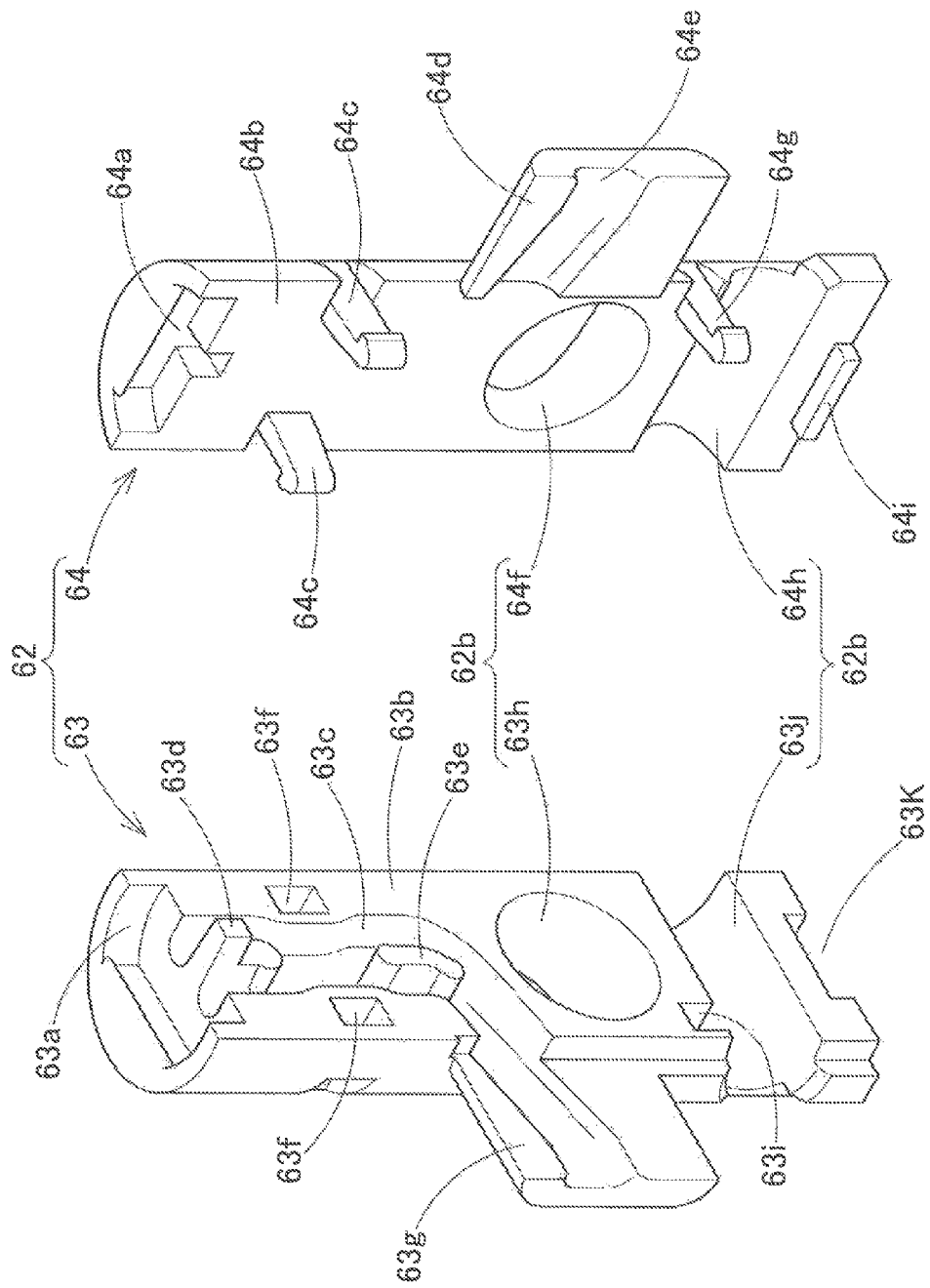

ACTUATOR

CROSS REFERENCE TO RELATED APPLICATIONS

The present application claims priority from Japanese Patent Application No. 2016-68880 of Aoyama et al., filed on Mar. 30, 2016, the entire disclosure of which is incorporated herein by reference.

BACKGROUND OF THE INVENTION

1. Field of the Invention

The present invention relates to an actuator which is suitably used for a safety system for a vehicle such as a hood lifting device which lifts a vehicle hood in the event of an impact between a pedestrian and the vehicle.

2. Description of Related Art

JP2015-123868 A discloses an actuator for use in a hood lifting device which lifts a vehicle hood. The actuator includes a housing section which houses a gas generator serving as a driving source, and a deploying section which covers the housing section and is deployable, with an actuating gas generated by the gas generator, to move relative to the housing section and lift the vehicle hood. The actuator is mounted on a pair of mounting regions of the hinge mechanism of the hood, i.e., on a first mounting region disposed on a hinge arm and on a second mounting region disposed on the part of the vehicle hood. More specifically, the housing section is mounted on the first mounting region disposed on the hinge arm while the deploying section is mounted on the second mounting region disposed on the part of the vehicle hood.

The housing section includes a case which is formed from metal and has a cylindrical shape, a securing member which is disposed inside the case and supports and fixes the gas generator (i.e., driving source) to the case, and a mounting hole which is formed through in a direction perpendicular to an axial center of the case for receiving a pivot member mounted on the first mounting region. The securing member is molded from synthetic resin together with the gas generator as an insert. The securing member is provided with a mounting hole which corresponds to the mounting hole of the case for receiving the pivot member.

More specifically, a collar, which is of metal and formed into an elliptic cylinder, is set inside the mounting holes of the case and securing member, and undetachably fixes the securing member to the case. The pivot member is put through the collar. In operation, when the actuator is actuated, i.e., when the gas generator emits an actuating gas, both of the housing section and deploying section are subjected to a pressure of the actuating gas. On the part of the housing section, the securing member supporting the gas generator is subjected to the gas pressure and presses the collar, and the collar presses the pivot member with the inner circumferential plane, while the housing section is subjected to a reaction force from the pivot member and supported and fixed by the pivot member. On the part of the deploying section, the deploying section is subjected to the gas pressure and moves relative to the housing section, such that the actuator is elongated and increases a distance between the first mounting region and second mounting region, thus lifting the hood.

In the above conventional actuator, the collar requires an enough rigidity to avoid deformation due to the pressure given by the securing member of the housing section at actuation of the actuator. Moreover, with the above conventional configuration, it is not easy to address an instance where a necessity occurs for a change in an outer diameter of the pivot member or in an outer diameter of the housing section because various items have to be reconfigured, e.g. inner diameters of the mounting hole of the case and securing member, a thickness (or an inner diameter and an outer diameter) of the collar, and a material of the collar. Therefore, a simpler configuration which can provide an improved joint strength between the housing section in which such a driving source as a gas generator is stored and a pivot member is desired.

SUMMARY OF THE INVENTION

The invention contemplates to solve the above-described problem, and has an object to provide an actuator which has an improved joint strength between a housing section, in which a driving source is stored, and a pivot member which mounts the housing section on a predetermined mounting region, with a simple configuration.

The actuator of the invention is configured to be mounted on a first mounting region and on a second mounting region so as to be operable to separate the second mounting region from the first mounting region. The actuator includes a housing section that houses a driving source and is adapted to be mounted on the first mounting region, and a deploying section that is adapted to be mounted on the second mounting region and deployable, when pressed by a driving force of the driving source, in such a fashion as to move forward relative to the housing section and to separate the second mounting region from the first mounting region. The housing section includes a case that is tubular and formed from metal, a securing member that is disposed inside the case and secured to the case for supporting the driving source, and a mounting hole that is used to mount the housing section on the first mounting region. The mounting hole is formed through the case and securing member in a direction perpendicular to an axial center of the case for receiving a pivot member connected to the first mounting region. The mounting hole is formed at a root end region of the housing section disposed on an opposite side to a direction towards which the deploying section is deployed with respect to the driving source. An inner circumferential plane of the mounting hole of the case is brought into contact with the pivot member at least on the region disposed towards the deploying direction of the deploying section when the actuator is actuated. The housing section further includes a fixing hole for receiving a fixing member that fixes the securing member to the case and prevents a disengagement of the securing member from the case in an opposite direction to the deploying direction of the deploying section. The fixing hole is formed through the case and the securing member in a direction perpendicular to the axial center of the case at a different position from the mounting hole.

When the actuator of the invention is actuated and the deploying section is deployed and move the second mounting region away from the first mounting region, the securing member of the housing section, which supports the gas generator, is pressed in a direction opposite to the deploying direction of the deploying section due to a reaction force of the driving force. At this time, since the securing member is integrally fixed to the case with the fixing member put through the fixing hole formed through the case and securing member, the securing member presses the case through the medium of the fixing member in the direction opposite to the deploying direction of the deploying section, and the case presses the pivot member in the direction to the deploying direction of the deploying section since the region of the inner circumferential plane of the mounting hole of the case disposed towards the deploying direction of the deploying section is brought into direct contact with the pivot member. That is, due to the direct contact between the pivot member and the inner circumferential plane of the mounting hole of the case, the housing section is supported by the pivot member in such a manner as to receive a reaction force. In comparison with a conventional configuration of like actuator in which a collar is disposed between the pivot member and housing section, this configuration will improve a joint strength between the pivot member and housing section and steady the deployment of the deployment section.

Therefore, the actuator of the invention has an improved joint strength between the housing section, in which the driving source is stored, and the pivot member which mounts the housing section on a predetermined mounting region, with a simple configuration that the case and securing member are integrated with the fixing member and the inner circumferential plane of the mounting hole of the case of metal is in direct contact with the pivot member.

In the above actuator of the invention, it is desired that an axial center of the mounting hole and an axial center of the fixing hole are orthogonal when projected on a plane perpendicular to an axial center of the actuator.

This configuration forms a certain distance between a periphery of the mounting hole and a periphery of the fixing hole although the mounting hole and the fixing hole are disposed close to each other, and helps suppress strength deterioration of the case and securing member. In other words, such configuration will enable the mounting hole and fixing hole to be disposed close to each other with less fear of strength deterioration, especially when a space is limited.

In the actuator of the invention, it is further desired that:
the driving source includes a gas generator which, when actuated, generates an actuating gas composed of a combustion gas;
the housing section and the deploying section are configured to slide against each other and form, there between, a gas chamber filled with the actuating gas when the actuator is actuated; and
the deploying section includes:
a pressured region that is subjected to a pressure of the actuating gas in the gas chamber;
a sliding region that adjoins the pressured region and is slidable against a constituent of the gas chamber on the part of the housing section; and
a connecting region that is adapted to be mounted on the second mounting region, the connecting region adjoining the pressured region on an opposite side to the sliding region with respect to the pressured region.

Compared with an instance employing such a driving source as a spring which would exert a mechanical biasing force, the gas generator fills the gas chamber instantly and deploys the deploying section quickly to move the second mounting region away from the first mounting region by making a gas pressure act on the pressured region such that the sliding region slides against the constituent of the gas chamber on the part of the housing section and the connecting region mounted on the second mounting region moves.

In the above instance, it is desired that:
the securing member includes a connector to be connected to a signal input region of the gas generator and a spacer that supports the connector;
the connector is composed of a pair of split parts that are split in a direction perpendicular to the axial center of the case and stored in and secured to the case in an integrated state;
the connector holds a socket for receiving the signal input region of the gas generator between the split parts;
the spacer is composed of a pair of split parts that are split in a direction perpendicular to the axial center of the case and stored in and secured to the case in an integrated state;
the spacer holds a lead wire extending from the socket between the split parts; and
the mounting hole and fixing hole of the housing section are disposed at a region farther away from the deploying direction of the deploying section than the lead wire held by the spacer.

The securing member with such a configuration can be assembled by disposing the socket and lead wire extending from the socket between the split parts of the connector and spacer, and mating the corresponding split parts. Then if the gas generator is connected to the connector, and this assembled module is set inside the case and the fixing member is fitted through the fixing hole, the housing section is completed. Unlike a conventional securing member which is integrally molded with a gas generator, this configuration will enable the gas generator to be stored in a separate place from the securing member until the assembling of the housing section, which is more preferable for a storage of the gas generator which can generate a combustion gas. The configuration of the invention will further facilitate a change of location of the gas generator inside the housing section, i.e., a change of initial volume of the gas chamber. That is, the location of the gas chamber inside the housing section can be changed only by changing the length of the spacer, without using a mold used to mold a conventional securing member, which will make it easy to adapt to a power change of the actuator.

Moreover, since the mounting hole and the fixing hole of the housing section are disposed at the position farther away from the deploying direction of the deploying section than the location of the lead wire held by the spacer, in a vicinity of the mounting hole and the fixing hole, there is no hollow region extending along the axial center of the housing section for storing the lead wire. Instead a solid region with a certain thickness is disposed in the vicinity of the mounting hole and the fixing hole of the spacer. The solid region will help maintain the strength of the spacer in the vicinity of the mounting hole and the fixing hole.

In the actuator with the above configuration, it is further desired that:
the case of the housing section is composed of an inner case that is generally tubular in shape and is provided, at a leading end region thereof, an opening for releasing the actuating gas generated by the gas generator;
the securing member is disposed in and secured to the inner case, and supports the gas generator such that a leading end of the gas generator for emitting the actuating gas faces towards the opening of the inner case;
the deploying section includes a ceiling wall that covers the opening of the inner case and serves as the pressured region and a circumferential wall that extends from an outer peripheral edge of the ceiling wall in such a manner as to cover an outer circumference of the inner case, such that the deploying section is so deployable as to move relative to the housing section when pressed by the actuating gas;

the inner case further includes a flange-like projecting region that projects out of an outer circumference of the leading end region of the inner case and is provided with a sealing member slidable against an inner circumferential plane of the circumferential wall of the deploying section; and the deploying section further includes, on an inner circumference of an end region of the circumferential wall remote from the ceiling wall, a holder region that projects inward so as to be slidable against a region of the outer circumference of the inner case except the flange-like projecting region and prevents the deploying section from being disengaged from the housing section when abutting against the flange-like projecting region.

With this configuration, when the gas generator is actuated and produces an actuating gas, the gas fills the gas chamber, which is defined by the ceiling wall of the deploying section, the region of the circumferential wall of the deploying section ranging from the ceiling wall to the region in contact with the sealing member of the flange-like projecting region of the housing section, and the leading end region of the housing section, and the ceiling wall is subjected to the pressure of the actuating gas, thus the deploying section moves forward relative to the housing section. When the deploying section is deployed, the inner circumferential plane of the circumferential wall of the deploying section and the sealing member of the flange-like projecting region of the housing section slide against each other while the holder region of the deploying section and the outer circumference of the housing section slide against each other, and the deploying section moves smoothly until the actuator reaches its maximum length, i.e. until the holder region abuts against the flange-like projecting region. This configuration contributes to lengthen an amount of deployment stroke of the actuator because the deploying section is configured such that the circumferential wall extends farther towards the first mounting region than the location of the gas generator so the holder region can slide on the outer circumferential plane of the housing section at the location of the gas generator.

In the above instance, it is further desired that the spacer of the securing member of the housing section includes a lead-out region that holds the lead wire in a bent fashion in a direction generally perpendicular to an axial center of the inner case and leads them out of the inner case, and that the deploying section further includes, at an end edge of the circumferential wall remote from the ceiling wall, a fitting recessed region in which the lead-out region of the spacer is fitted.

With this configuration, since the lead-out region of the housing section is fitted in the fitting recessed region of the deploying section, the lead-out region holds the deploying section from rotating in a circumferential direction, i.e., positions the deploying section with respect to the housing section, such that the direction along which the deploying section is mounted on the second mounting region is steadied against the axial direction of the mounting hole of the housing section, thereby facilitating the mounting work of the actuator on the first mounting region and second mounting region.

The actuator of the invention can preferably be configured to be employed in a hood lifting device for lifting a rear end region of a hood of a vehicle, by mounting the housing section on the first mounting region disposed on the part of a body structure of the vehicle beneath the rear end region of the hood while mounting the deploying section on the second mounting region disposed at the rear end region of the hood.

BRIEF DESCRIPTION OF DRAWINGS

FIG. 2 is a schematic partial vertical section of the vehicle of FIG. 1 showing the vehicle before and after operation of the actuator;

FIG. 14 is a schematic perspective view of the split parts of the spacer.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
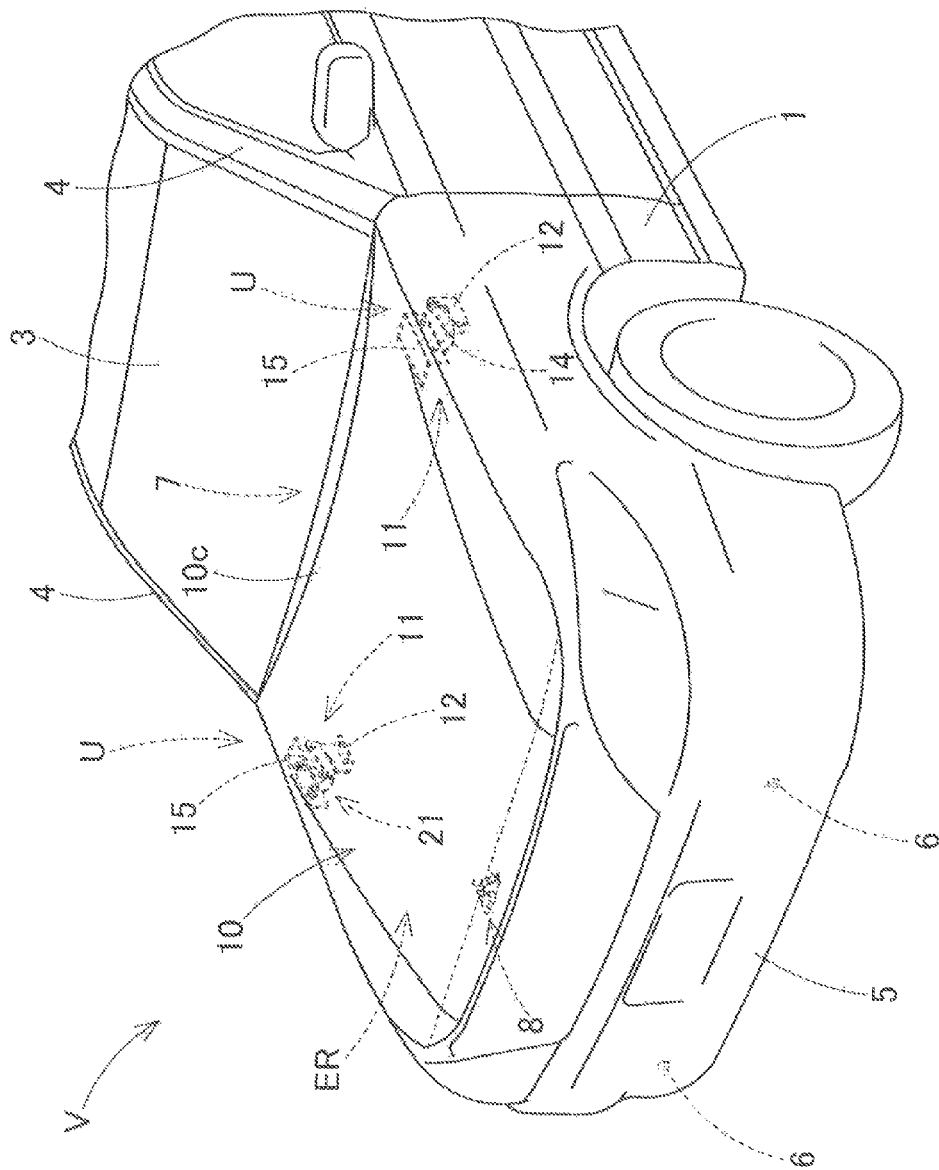
FIG. 1 is a schematic perspective view of a vehicle equipped with a hood lifting device using an actuator embodying the invention.

As shown in FIGS. 1 and 2, an actuator 21 embodying the invention is used in a hood lifting device U as a vehicle safety system, and is mounted on a hinge mechanism 11 at a rear end 10c of a hood 10 of a vehicle V.

In the illustrated embodiment, the vehicle V includes inside a front bumper 5 (FIG. 1) a sensor 6 that detects or predicts an impact against a pedestrian. When a not-shown control circuit detects a collision between the vehicle V and a pedestrian by a signal fed from the sensor 6, it ignites not-shown gunpowder of a gas generator 52 of the actuator 21 to generate an actuating gas G. That is, the control circuit actuates the actuator 21 to actuate the hood lifting device U (see (B) of FIG. 2 and FIG. 5).

As shown in FIGS. 1 and 2, the hood 10 covers an engine room ER of the vehicle V and is joined to the body structure 1 of the vehicle V with the hinge mechanisms 11 so as to be openable forward. The hinge mechanisms 11 are located on the left and right sides of a region of the hood 10 in a vicinity of the rear end 10c of the hood 10. The hood 10 is fabricated of plate material of steel, aluminum alloy or the like, and is composed of an outer panel 10a, which forms the top face, and an inner panel 10b, which forms the lower face and is enhanced in strength than the outer panel 10a. The hood 10 is plastically deformable so as to absorb a kinetic energy of a pedestrian when impacting against the pedestrian. As shown in (B) of FIG. 2, if a collision occurs between the vehicle V and a pedestrian, the actuators 21 will be actuated to lift the hold 10, thus form a deformation space S between the rear end 10c of the hood 10 as lifted and the engine room ER. The deformation space S will allow a greater plastic deformation of the hood 10, thus the hood 10 will absorb a greater kinetic energy of the pedestrian.

The hinge mechanisms 11 are located on the left and right sides of the rear end 10c of the hood 10. Each of the hinge mechanisms 11 is provided with a hinge base 12, a mounting plate 15 and a hinge arm 14. The hinge base 12 is secured to the vehicle body structure 1 beneath the rear end 10c of the hood 10. The mounting plate 15 is located on the underside of the rear end 10c of the hood 10. The hinge arm 14 is pivotally supported by the hinge base 12 and mounting plate 15. More specifically, the hinge base 12 is secured to a mounting flange 2 jointed to a hood ridge reinforcement 2, which is part of the vehicle body structure 1. When the hood 10 is opened for normal use, it rotates around the root ends 14a, which are disposed on the part of the hinge bases 12, as indicated by double-dotted lines in (A) of FIG. 2.

Each of the hinge arms 14 is so disposed as to extend forward from the root end 14a to the leading end 14b. The root end 14a is jointed to the rear end region of the hinge base 12 with a support shaft 13, such that the hinge arms 14 are rotatable about the support shafts 13. The leading end 14b is also jointed to the front end region of the mounting plate 15 with a support shaft 16, such that the hinge arms 14 are rotatable about the support shafts 16. Each of the support shafts 13 and 16 are arranged along a left and right direction of the vehicle V both on the left and right sides. Each of the actuators 21 is jointed to a mounting region 14c of the hinge arm 14 and to a mounting region 15a of the mounting plate 15. However, when the hood 10 is opened for normal use, the actuators 21 do not extend because each of later-described retaining rings 48 (FIG. 4) retains a later-described outer member 70, such that the hinge arms 14 do not rotate relative to the mounting plates 15 at normal use. That is, the hood 10 opens about the support shafts 13 at normal use. Specifically, as indicated by solid lines and double-dotted lines in (A) of FIG. 2, the hood 10 opens forward about the support shafts 13 from the front end 10f along with the rise of the leading ends 14b of the hinge arms 14. If the front end 10f is put down, the hood 10 rotates about the support shafts 13 and closes.

The hinge mechanisms 11 on the left and right sides are disposed in a bilaterally symmetric fashion. Each of the actuators 21 is jointed to the mounting region 14c of the hinge arm 14 and mounting region 15a of the mounting plate 15 by the opposite ends (connecting regions 40 and 78). The mounting region 14c (or a first mounting region, as will be described later) of the hinge arm 14 is located toward the leading end 14b relative to the center between the root end 14a and leading end 14b. The mounting region 15a (or a second mounting region, as will be described later) of the mounting plate 15 is located at the rear of the support shaft 16.

A known hood lock mechanism 8 is disposed in a vicinity of the front end of the hood 10. The hood lock mechanism 8 includes a lock striker and a latch. The lock striker is secured to an underside of the front end 10f region of the hood 10, and the latch is provided on the part of the vehicle body structure 1 and retains the lock striker. The latch is so configured as not to release the lock striker unless a not-shown lever is operated. Therefore, the front end of the hood 10 stay closed due to the locking of the hood lock mechanism 8 even if the rear end 10c of the hood 10 is lifted. When the actuators 21 are actuated and extend, an intersection angle θ0 (see (B) of FIG. 2) between the hinge arm 14 and mounting plate 15 is increased and the hood 10 is lifted at the rear end 10c while the front end 10f stays unraised.

As shown in (A) of FIG. 2, at the rear of the hood 10 is a cowl 7 which includes a cowl panel 7a and a cowl louver 7b. The cowl panel 7a is a part of the vehicle body structure 1 and has a high rigidity. The cowl louver 7b is fabricated of synthetic resin and is located above the cowl panel 7a. The cowl louver 7b is so disposed as to continue to a lower region of the front windshield 3 on the rear end. As shown in FIG. 1, the front pillars 4 are located on the left and right of the front windshield 3.

Figure 3:
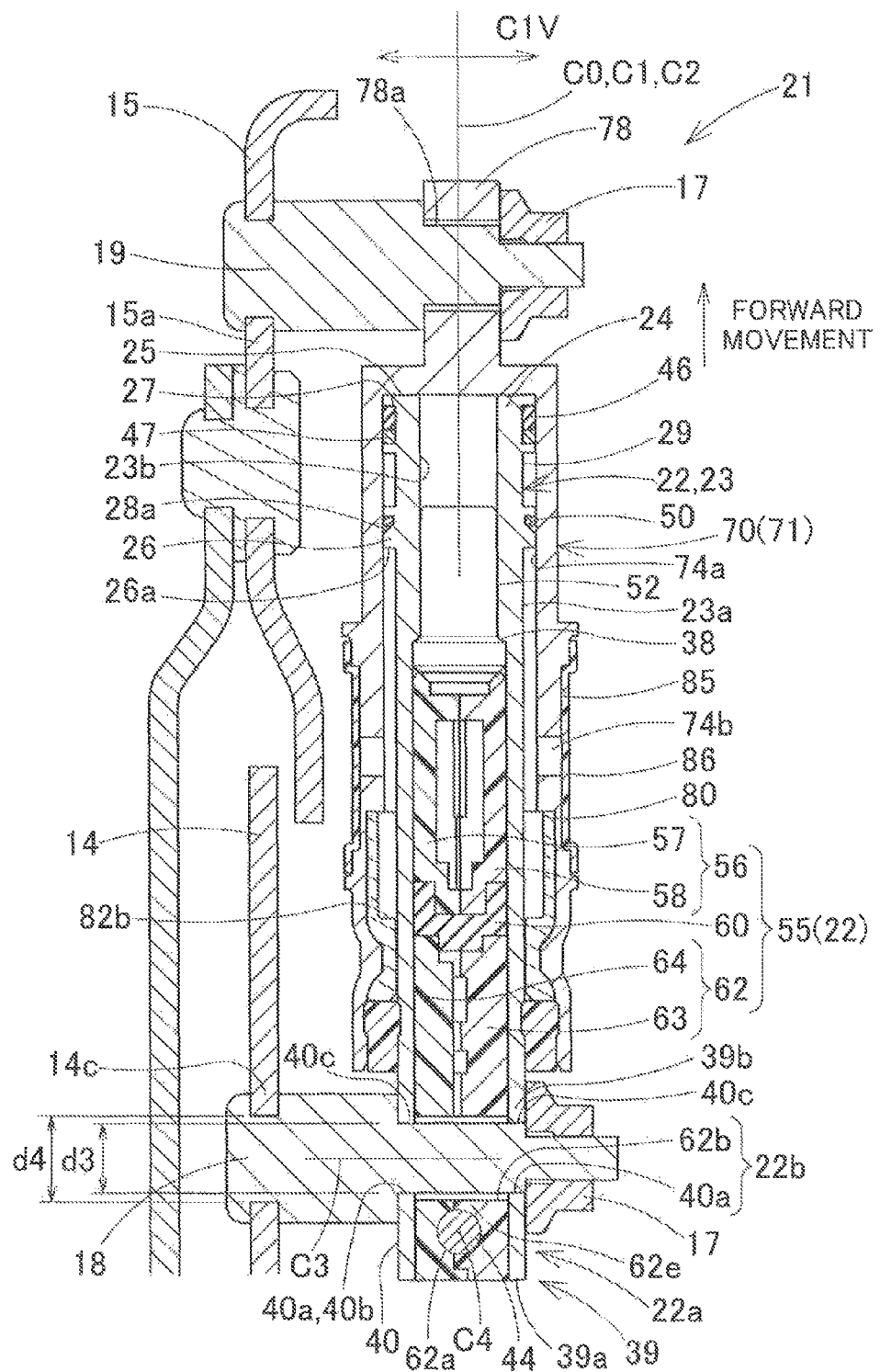
FIG. 3 is a schematic sectional view of the actuator of the embodiment taken along line III-III of (A) of FIG. 2.
Figure 4:
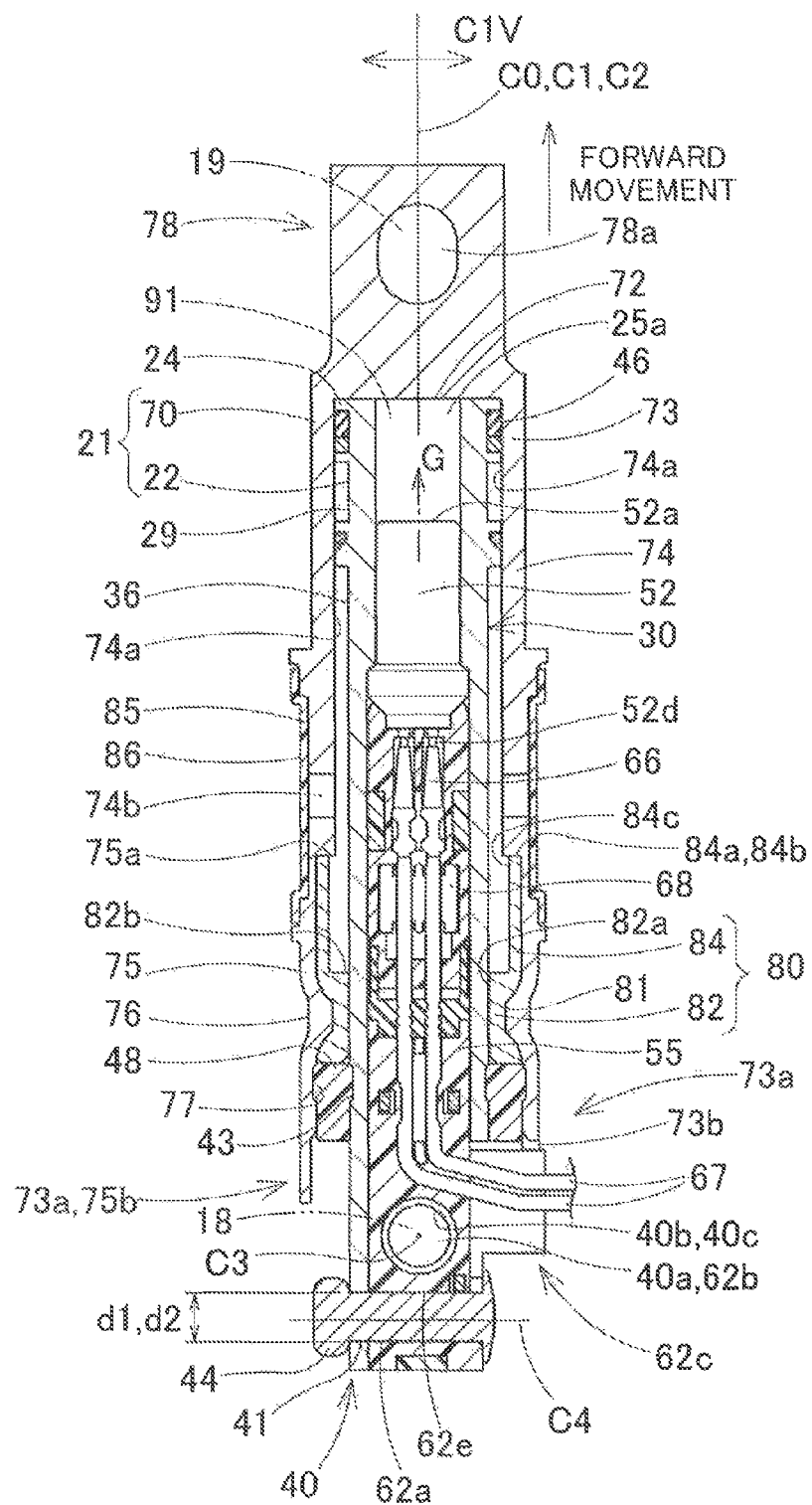
FIG. 4 is a schematic vertical section of the actuator of the embodiment.

As shown in FIGS. 3 and 4, each of the actuators 21 of the illustrated embodiment includes a gas generator 52, an inner member (or a housing section) 22 and an outer member (or a deploying section) 70 covering the inner member 22. The gas generator 52, a drive source of the actuator 21, generates an actuating gas G when actuated. The inner member 22 houses the gas generator 52. The outer member 70 is configured to move forward and lift the hood 10 when pushed by the actuating gas G generated by the gas generator 52.

The inner member 22 is composed of a case (or an inner case) 23 which is generally tubular and formed from such metal as steel, and a securing member 55 which holds (supports) the gas generator 52 and fixes the gas generator 52 to the inner case 23 inside the inner case 23.

Figure 9:
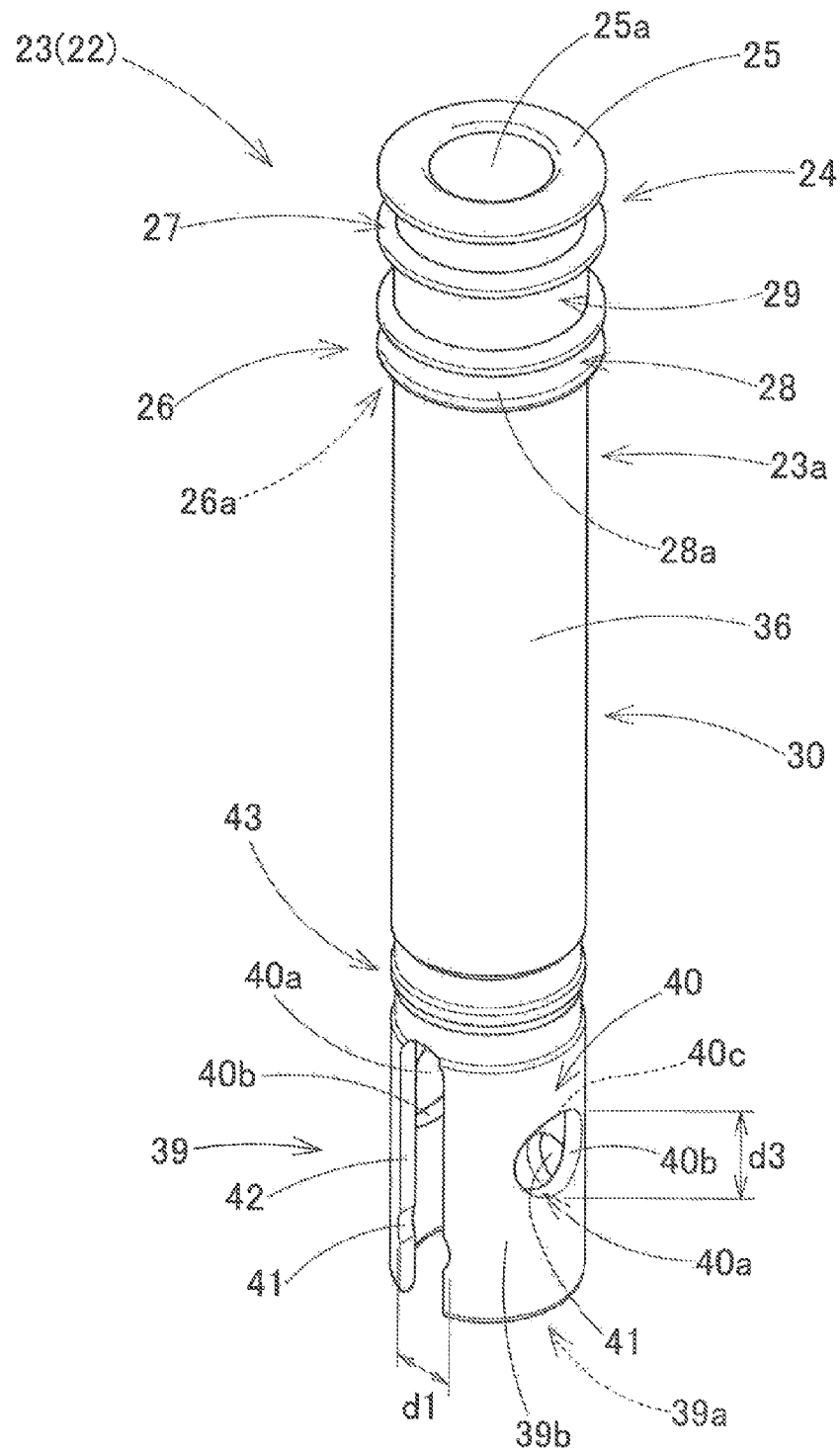
FIG. 9 is a schematic perspective view of an inner case of an inner member of the actuator.

Referring to FIGS. 3, 4 and 9, the inner case 23 of the inner member 22 includes a leading end region 24 and a root end region 39. A round opening 25a for releasing the actuating gas G is disposed at the leading end plane 25 of the leading end region 24. The root end region 39 is tubular in shape and provided with a connecting region 40 which is mounted on the mounting region (i.e., the first mounting region) 14c of the hinge mechanism 11. A mounting hole 40a is formed through a circumferential wall 39b of the connecting region 40 in a direction perpendicular to an axial center C1 of the inner member 22 for receiving a pivot member (pivot pin or pivot bolt) 18 of the mounting region 14c of the hinge arm 14. The connecting region 40 is pivotally coupled to the pivot member 18 and mounting region 14c with a nut 17 fastening the pivot member 18.

The connecting region 40 of the inner case 23, which is made of metal and has a high rigidity, constitutes a connecting region 22a of the inner member 22, and the mounting hole 40a of the connecting region 40 constitutes a mounting hole 22b of the inner member 22. A region of an inner circumferential plane 40b of the mounting hole 40a in a direction toward which the outer member 70 is deployed is pressed against the pivot member 18 and serves as a pressured inner plane 40c.

The root end region 39 is also provided with a fixing hole 41 for receiving a rivet (i.e., fixing member) 44 which serves as a fixing member to prevent the disengagement of the securing member 55 from the inner case 23. The fixing hole 41 is also formed through the root end region 39 in a direction perpendicular to the axial center C1 of the inner member 22. The fixing hole 41 is round in shape and disposed toward the end plane 39a of the root end region 39, i.e., at a farther remote position from the gas generator 52 than the mounting hole 40a. An axial center C4 of the fixing hole 41 and an axial center C3 of the mounting hole 40a are orthogonal when projected on a plane perpendicular to the axial center of the actuator. There is also disposed a housing recess 42 (FIG. 9) in a vicinity of the end plane 39a of the root end region 39. As described later, a lead-out region 62c of the securing member 55, which holds lead wires 67, fits in the housing recess 42.

As shown in FIG. 3, the inner case 23 further includes, at a position on an inner circumferential plane 23b remote from the leading end region 24, an inclined step 38 which enlarges in diameter towards the root end region 39 and is used for positioning of the gas generator 52.

Figure 6:
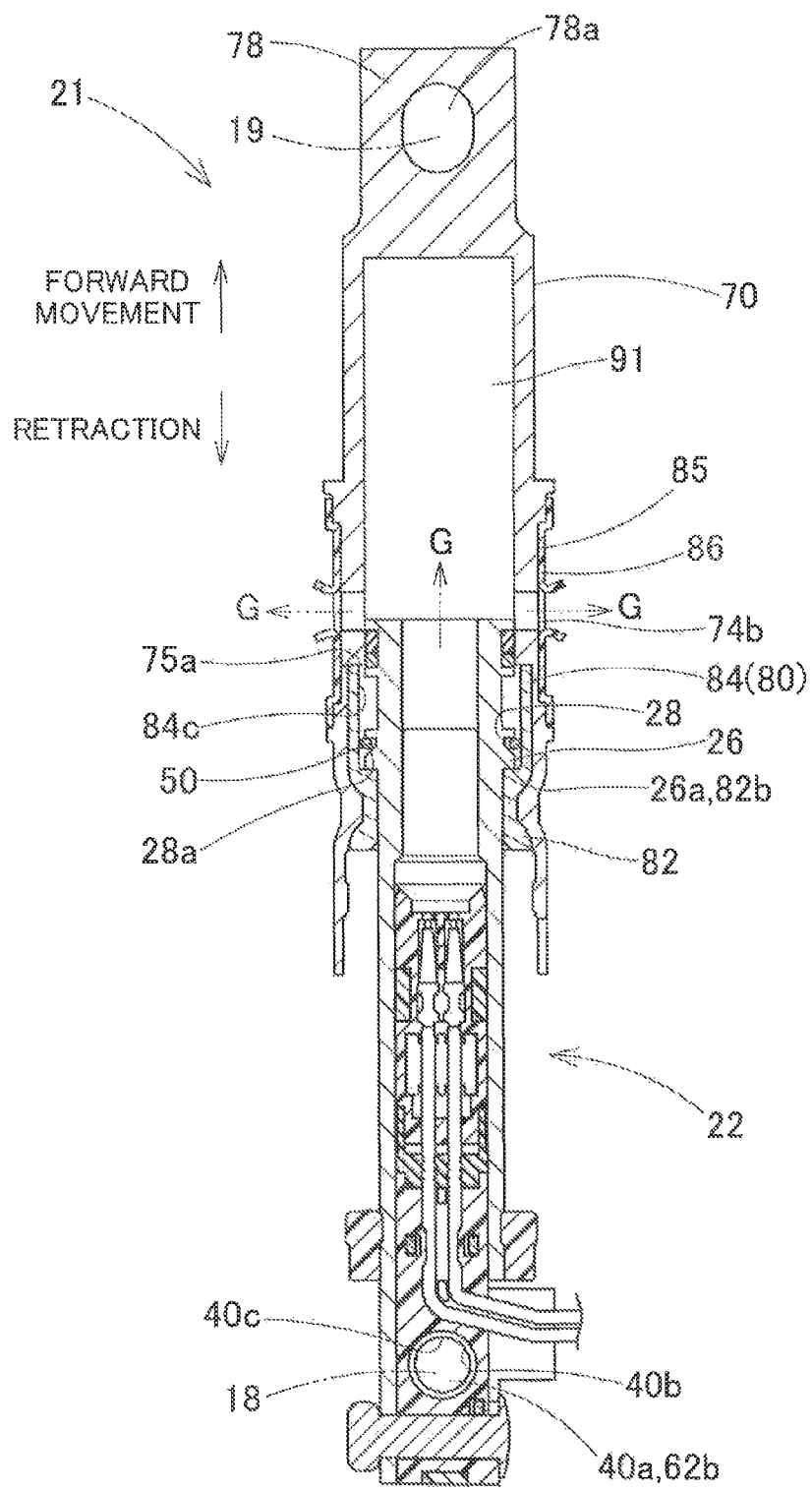
FIG. 6 is a schematic vertical section of the actuator as extended to the maximum length.

Further, the inner case 23 includes, at the leading end region 24, a flange-like projecting region 26 which projects outwardly. The flange-like projecting region 26 serves as a stopper to prevent the outer member 70 from being disengaged from the inner member 22. As shown in FIG. 6, a plane of the flange-like projecting region 26 facing towards the root end region 39 serves as a stopping plane 26a which abuts against a leading end plane 82b of a sliding region 82 of a holder region 80 of the outer member 70, as will be described later. The stopping plane 26a stops the outer member 70 from moving farther forward and limits the maximum length (maximum deployment stroke) of the actuator 21 when the actuator 21 is actuated.

On the outer circumferential plane of the flange-like projecting region 26, there are formed an annular groove 27 which is disposed towards the leading end plane 25, a storage groove 28 which is disposed towards the stopping plane 26a and a recessed groove 29 which is disposed between the annular groove 27 and storage groove 28. Each of the grooves 27, 28 and 29 are formed over an entire outer circumference of the flange-like projecting region 26. A sealing member 46 composed of a rubber O-ring and a back-up ring 47 formed from metal are set in the annular groove 27, and a lock ring 50 is set in the storage groove 28. As described later, the sealing member 46 is slidable against an inner circumferential plane 74a of a circumferential wall 73 of the outer member 70 while being appressed against the inner circumferential plane 74a, thus helps secure a gas tightness during the deployment of the outer member 70. The back-up ring 47 is disposed on a side of the sealing member 46 towards the recessed groove 29. The back-up ring 47 is smaller in outer diameter than the sealing member 47, and provided with a not-shown slit for enabling an enlargement of the diameter. The back-up ring 47 supports the sealing member 46 in order to steady the sealing of the sealing member 46 against the outer member 70.

The lock ring 50 stored in the storage groove 28 is a constituent of a retraction-preventing lock mechanism BR (FIG. 7) that prevents the outer member 70 from retracting after having completed deployment. The lock ring 50 is composed of a C-ring which is formed of an elastically deformable spring steel or the like having a round cross section. The storage groove 28 has such a generally triangular cross section that opens downwardly, and includes a slope restricting plane 28a which is so inclined as to enlarge towards the root end region 39. The lock ring 50 is housed in the storage groove 28 in such an elastically deformed state that is radially inwardly contracted. Although biased to expand radially outwardly, the inner circumferential plane 74a of the circumferential wall 73 of the outer member 70 regulates the lock ring 50 from doing so. At deployment of the actuator 21, when an enlarged diameter region 75 (more particularly, an extended region 84) of the outer member 70 reaches the location of the lock ring 50, the lock ring 50 is allowed to expand but is prevented from disengaging from the storage groove 28 due to an inner circumferential plane 84c of the extended region 84. Then when the outer member 70 moves backward, the lock ring 50 is sandwiched between a step plane (an end plane) 75a of the enlarged diameter region 75 and the slope restricting plane 28a and stops the outer member 70 from retracting further.

The inner case 23 further includes, on the outer circumferential plane 23a of the root end region 39, a retaining groove 43 which is formed all over in a circumferential direction. A retaining ring 48, which is fabricated of rubber, synthetic resin or the like, is set in the retaining groove 43. The retaining ring 48 also fits in a retaining groove 77 formed on an inner circumferential plane of a root end region of the circumferential wall 73 of the outer member 70 so as to prevent an extension of the actuator 21 when the hood 10 is opened from the front end. When the actuator 21 is actuated, the retaining ring 48 stays retained by the inner case 23 but is disengaged from the retaining groove 77 of the outer member 70, thus allowing a deployment of the outer member 70.

The outer circumferential plane 23a of a columnar intermediate region 30 of the inner case 23 between the leading end region 24 and root end region 39 serves as a sliding region 36 which is slidable against a later-described sliding region 82 of the holder region 80 of the outer member 70.

Figure 5:
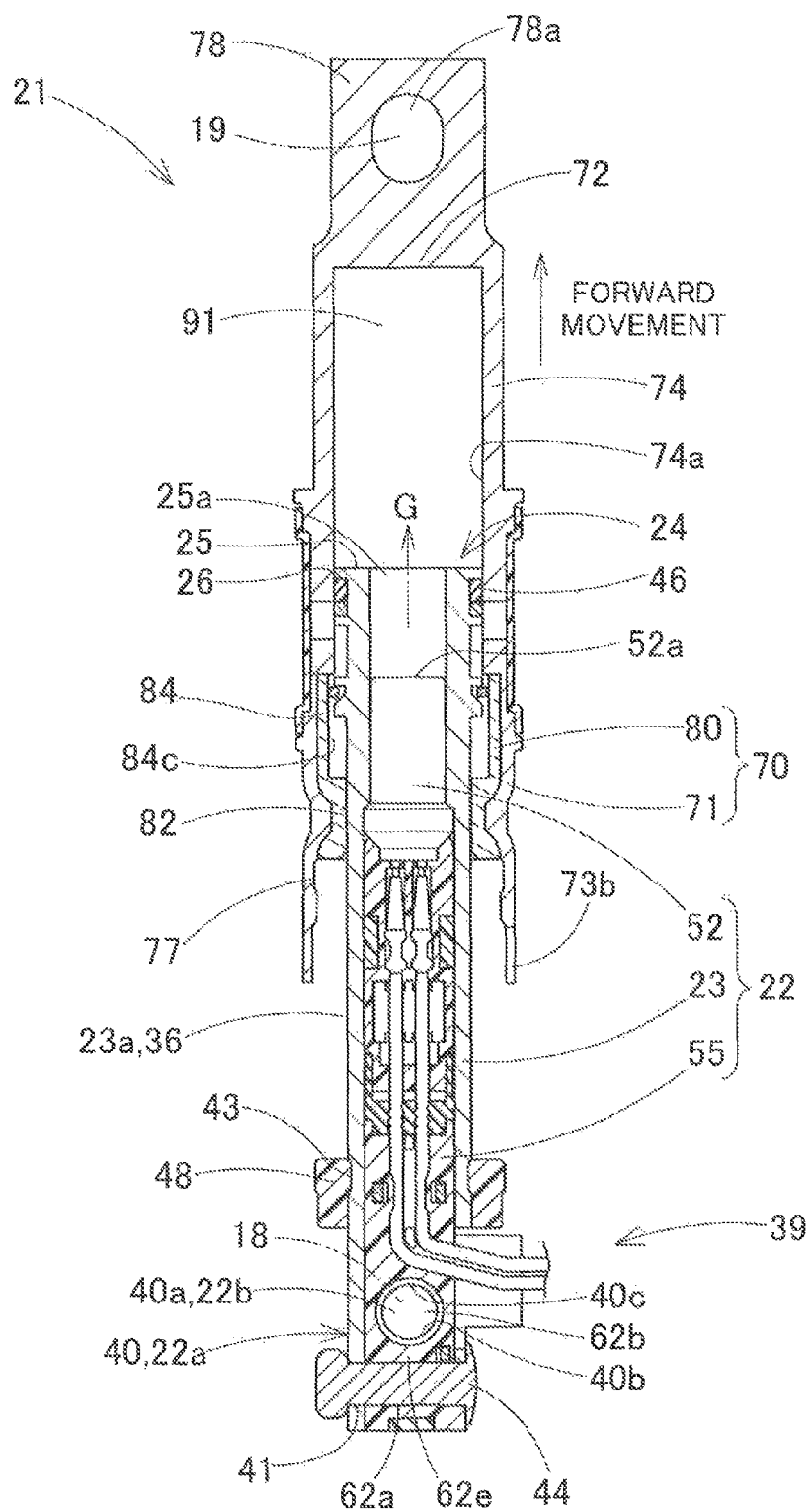
FIG. 5 is a schematic vertical section of the actuator of the embodiment as actuated.
Figure 11:
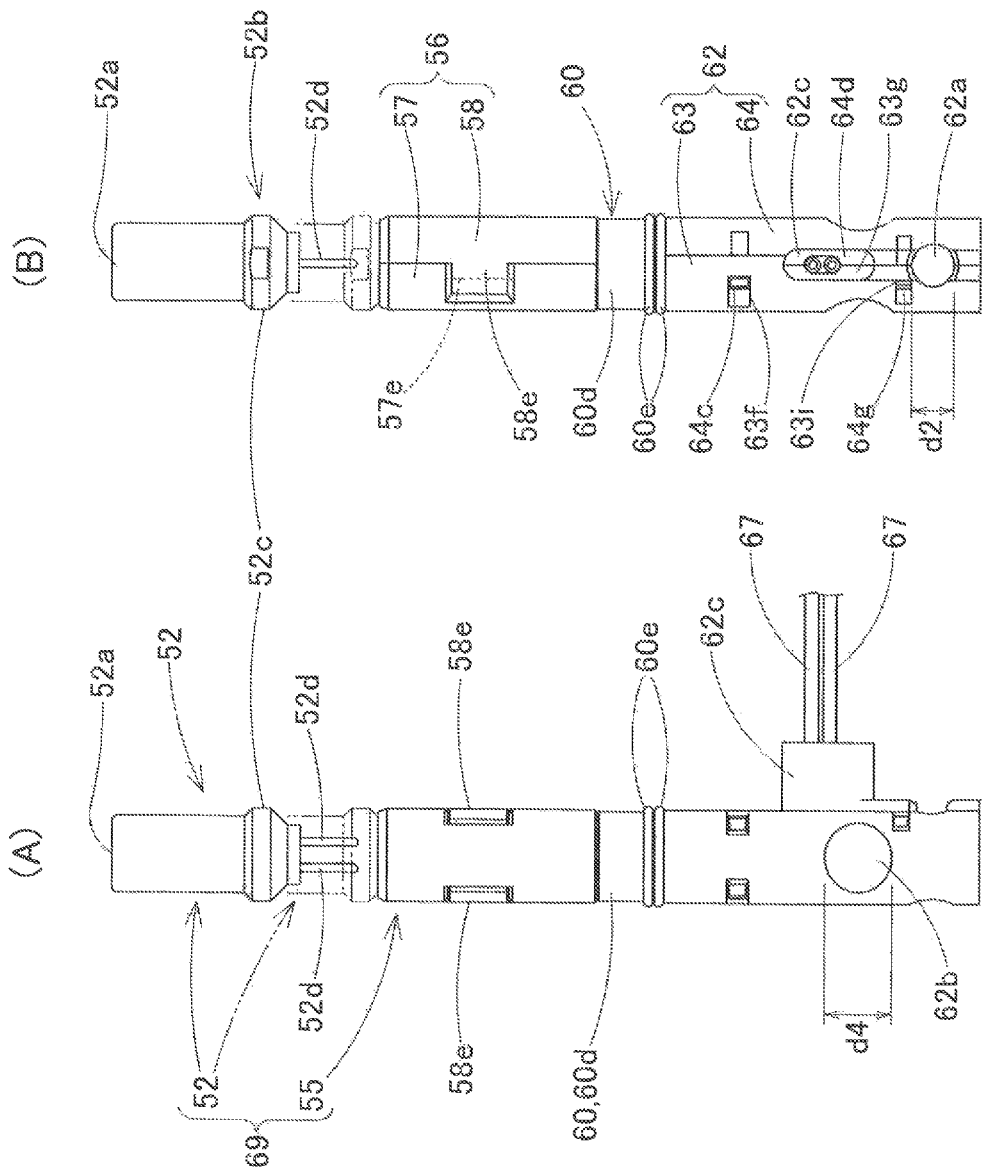
FIG. 11 depicts the securing member by a schematic front elevation and a schematic side view.

The gas generator 52 is of a squib, a micro gas generator or the like which ignites a not-shown predetermined powder and generates an actuating gas G by combustion of the powder itself or by combustion of a gas generant ignited by the powder. The gas generator 52 emits the actuating gas out of the leading end 52a, as shown in FIGS. 3 to 5. As shown in FIGS. 3, 4 and 11, in a root region 52b of the gas generator 52, which is remote from the leading end 52a, there is provided a flange region 52c to abut against the step 38 of the inner case 23. Two terminal pins 52d, which constitute a signal input region for receiving an actuating electric signal, protrude out of the end plane of the root region 52b.

Referring to FIGS. 3, 4 and 10 to 12, the securing member 55 is generally cylindrical in shape, and holds the gas generator 52 and fixes the same to the inner case 23 inside the inner case 23. The securing member 55 includes a round fixing hole 62a which corresponds to the fixing hole 41 of the inner case 23 for receiving the rivet 44 to be fastened to the inner case 23. The fixing hole 62a is formed through the securing member 55 in a direction perpendicular to the axis of the securing member 55. The securing member 55 further includes a round mounting hole 62b which is concentric with the mounting hole 40a of the inner case 23. The mounting hole 62b is formed through the securing member 55 in a direction perpendicular to the axis of the securing member 55.

The securing member 55 further includes a connector 56 for receiving the terminal pins 52d of the gas generator 52, a spacer (or an extension spacer) 62 that supports and fixes the connector 56 inside the inner case 23 and store lead wires 67 extending from the connector 56, and a cap 60 for securing a gas sealing property. In the illustrated embodiment, the fixing hole 62a and mounting hole 62b are formed on the spacer 62.

As shown in FIGS. 3 and 4, in the illustrated embodiment, although an inner diameter d2 of the fixing hole 62a of the securing member 55 is equal to an inner diameter d1 of the fixing hole 41 of the inner case 23, an inner diameter d4 of the mounting hole 62b of the securing member 55 is slightly greater than an inner diameter d3 of the mounting hole 40a of the inner case 23 (that is, d4>d3). When the securing member 55 is housed inside the inner case 23, the fixing hole 62a and mounting hole 62b are disposed at the same position as the positions that the fixing hole 41 and mounting hole 40a of the inner case 23 are disposed, in a concentric fashion to the fixing hole 41 and mounting hole 40a.

Figure 10:
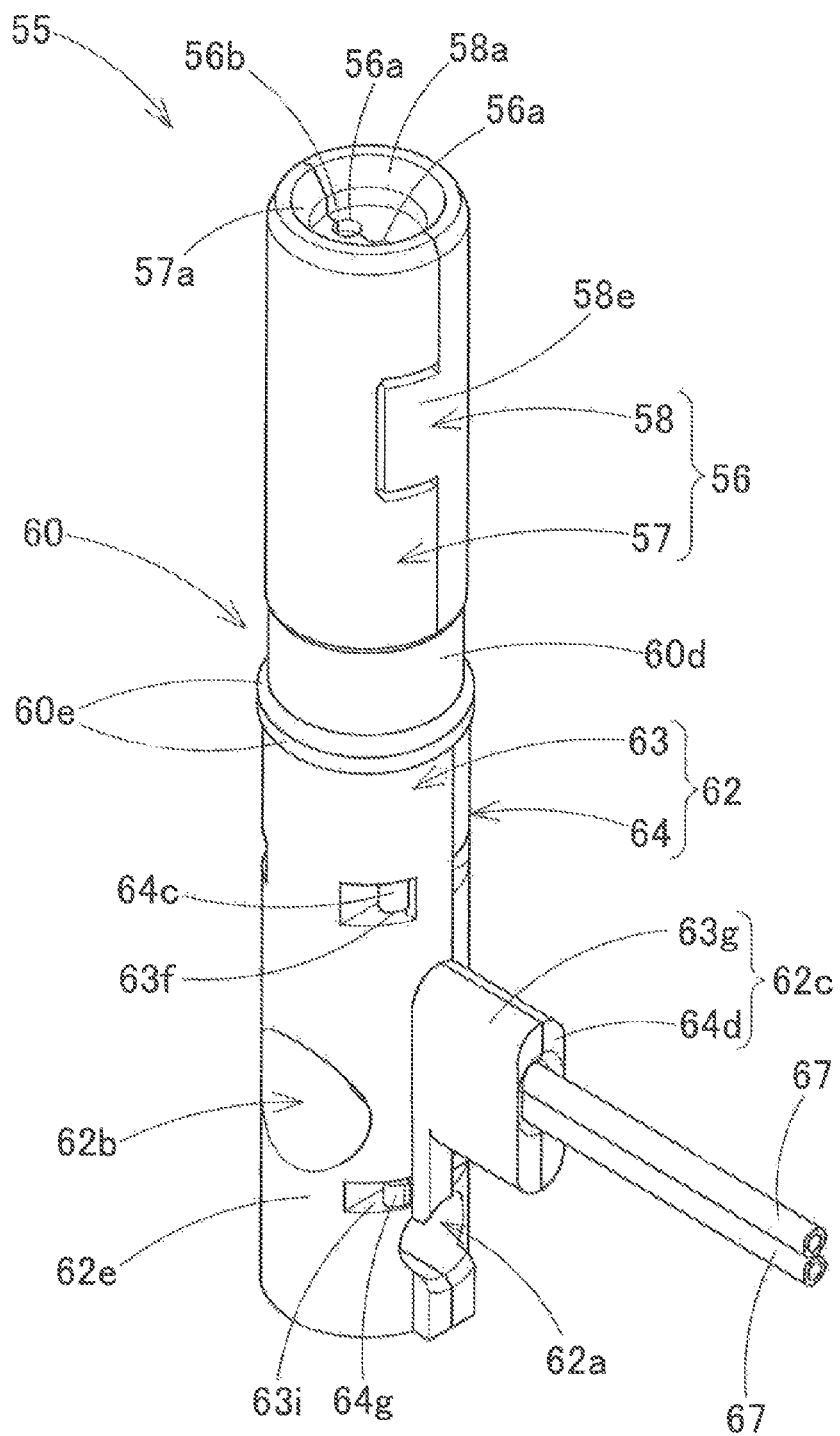
FIG. 10 is a schematic perspective view of a securing member of the inner member of the actuator.

Referring to FIGS. 3 and 10 to 13, the connector 56 is composed of a pair of split parts 57 and 58 (a first split part 57 and a second split part 58) of such synthetic resin as polyamide, which are split up in halves in a direction C1V which extends perpendicularly to the axis of the inner member 22 and in parallel to the axial center C3 of the mounting hole 40a. As shown in FIGS. 10 and 11, the connector 56 includes two assembling holes 56a for receiving the terminal pins 52d of the gas generator 52 and a sunken fitting region 56b in which the root region 52b of the gas generator 52 fit, on the upper end plane. The connector 56 further includes, at the lower end, a fitting region 56c which protrudes downwardly to be fitted in the cap 60.

As shown in FIG. 4, the split parts 57 and 58 coupled together hold there between two sockets (or pin sockets) 66 for receiving the terminal pins 52d of the gas generator 52 and lead wires 67 extending from the sockets 66. A member designated by the reference numeral 68 is a support member which supports the lead wires 67.

Figure 13:
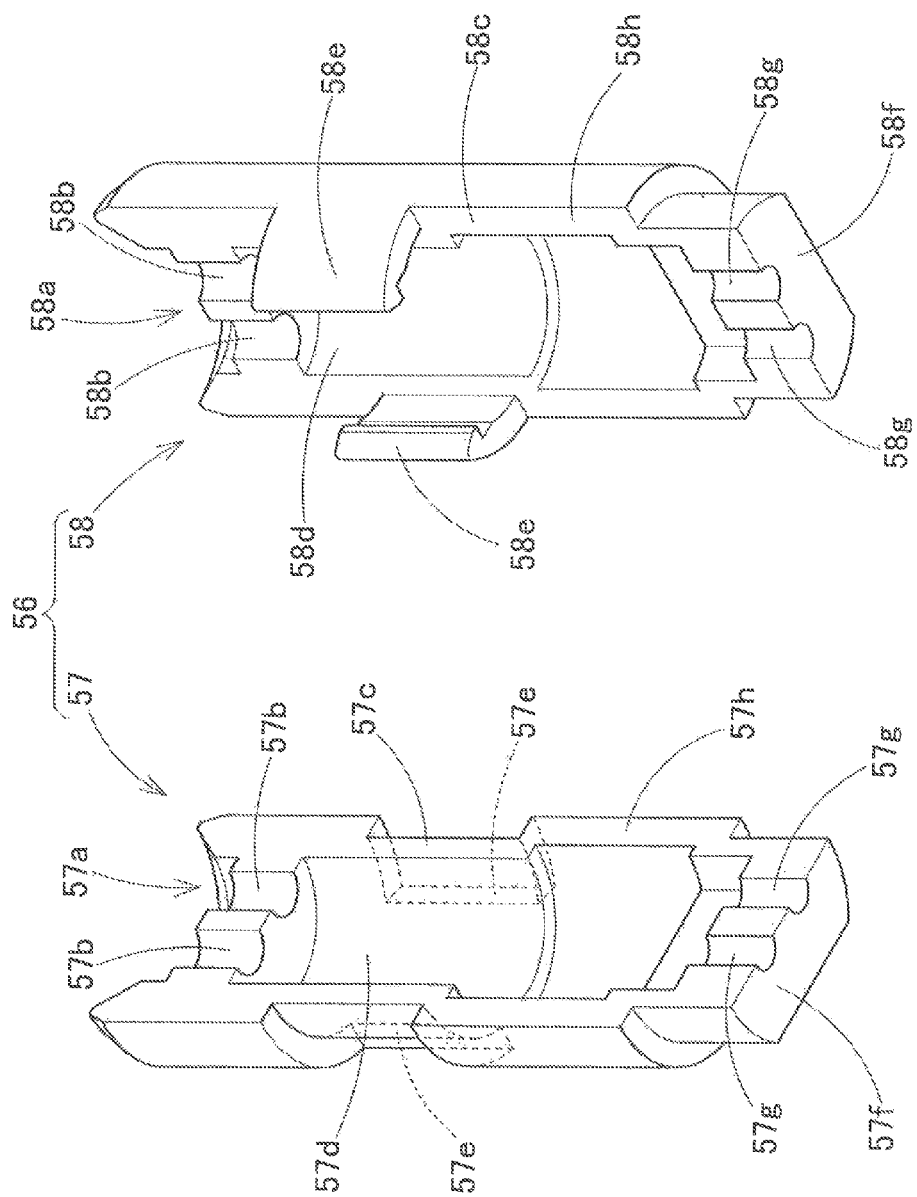
FIG. 13 is a schematic perspective view of the split parts of the connector.

Referring to FIG. 13, the first split part 57 includes, at the leading end facing towards the gas generator 52, a ceiling board region 57a having a half disc shape. Beneath the ceiling board region 57a is a half-piped region 57c which has a generally half-piped shape and has a storage region 57d for storing the pin sockets 66, lead wires 67 and support member 68. The ceiling board region 57a is provided with two through depressed regions 57b, each having a half-round shape, to form the assembling holes 56a for receiving the terminal pins 52d. A bottom board region 57f, which is formed into a half disc shape, is located at the lower end of the half-piped region 57c. The first split part 57 further includes, on the outer side of each of opposite edges of the half-piped region 57c, a retaining region 57e engageable with a retaining hook 58e of the second split part 58 to integrate the split parts 57 and 58. The bottom board region 57f is provided with two supporting depressed regions 57g for storing and supporting the lead wires 67.

Referring also to FIG. 13, similarly to the first split part 57, the second split part 58 includes, at the leading end facing towards the gas generator 52, a ceiling board region 58a having a half disc shape. When coupled together, the ceiling board region 58a and the ceiling board region 57a of the first split part 57 form the sunken fitting region 56b for receiving the root region 52b of the gas generator 52. Beneath the ceiling board region 58a is a half-piped region 58c which has a generally half-piped shape and has a storage region 58d for storing the pin sockets 66, lead wires 67 and support member 68. The ceiling board region 58a is provided with two through depressed regions 58b, each having a half-round shape, to form the assembling holes 56a for receiving the terminal pins 52d in combination with the through depressed regions 57b of the first split part 57. A bottom board region 58f, which is formed into a half disc shape, is located at the lower end of the half-piped region 58c. The second split part 58 further includes a pair of retaining hooks 58e which protrude out of opposite edges of the half-piped region 58c for engagement with the retaining regions 57e of the first split part 57 to integrate the split parts 57 and 58. The bottom board region 58f is provided with two supporting depressed regions 58g for storing and supporting the lead wires 67.

To assemble the connector 56, the pin sockets 66, lead wires 67 and support member 68 are firstly disposed at predetermined positions in the storage regions 57d and 58d. Then the first split part 57 and second split part 58 are integrated by mating the opposed parting planes (abutting planes) 57h and 58h of each of the ceiling board regions 57a and 58a, each of the half-piped region 57c and 58c and each of the bottom board regions 57f and 58f while the retaining hooks 58e and retaining regions 57e are fastened together. Thus the connector 56 is provided.

Figure 12:
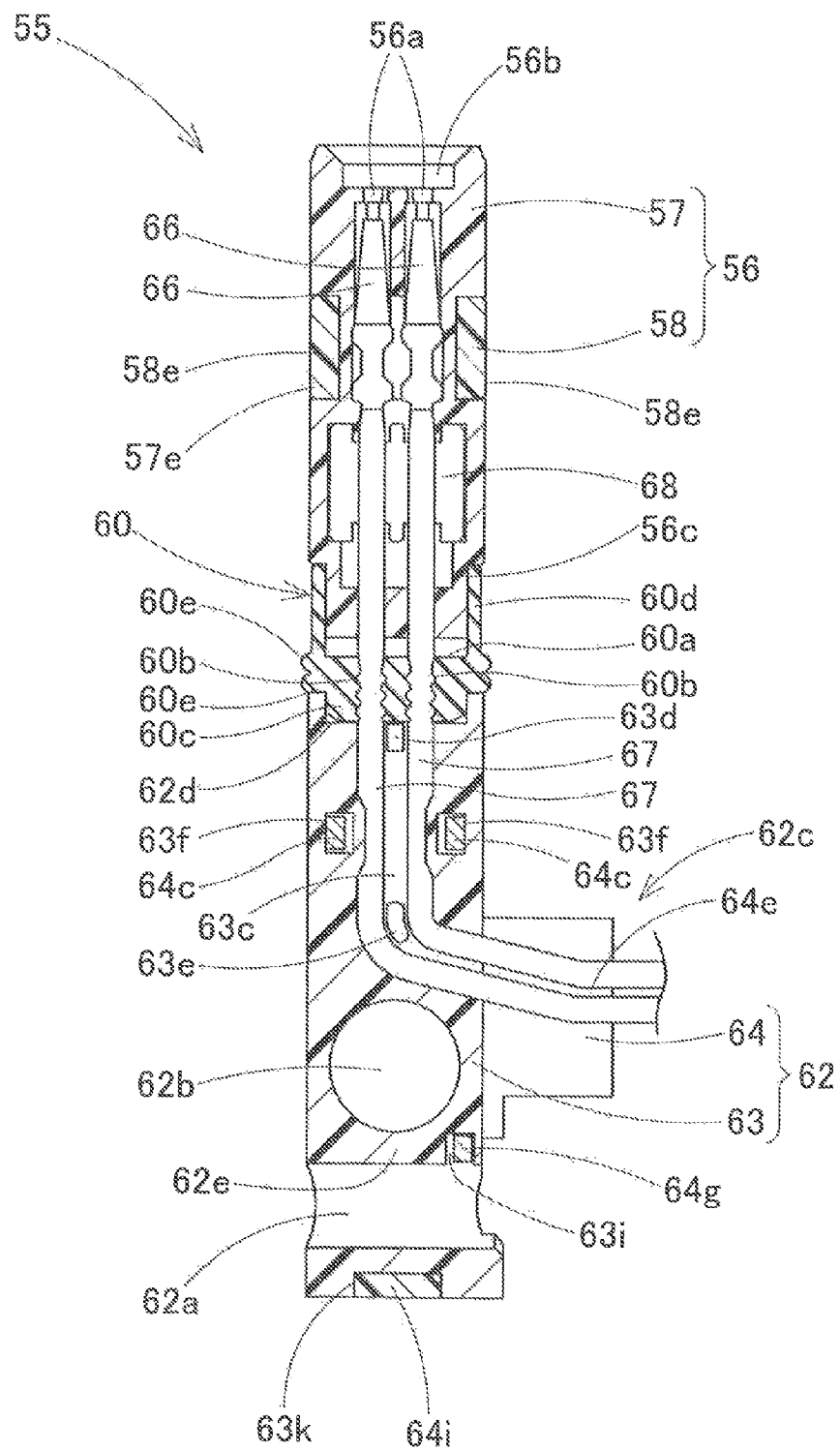
FIG. 12 is a schematic vertical section of the securing member taken along a line slightly dislocated from the parting line of split parts of the connector and spacer.

Referring to FIGS. 10 to 12, the cap 60 is made from rubber with sealing property. The cap 60 includes a bottom wall 60a formed generally into a disc and a circumferential wall 60d which is formed generally into a cylinder extending upwardly from the outer peripheral edge of the bottom wall 60a, such that the cap 60 has a U-shaped sectional shape. The bottom wall 60a includes two through holes 60b for receiving the lead wires 67, and a generally columnar projecting region 60c which protrudes downwardly from the underside of the bottom wall 60a to be fitted in the top region of the spacer 62. Further, on the outer circumferential plane of the bottom wall 60a, there are formed two annular sealing lips 60e to be pressed against the inner circumferential plane 23b of the root end region 39 of the inner case 23.

Referring to FIGS. 3, 4, 10 to 12 and 14, the spacer 62 is made from synthetic resin such as polyamide, and has a generally columnar shape. The spacer 62 includes a lead-out region 62c which protrudes outwardly at a vicinity of the lower end of the spacer 62. The lead-out region 62c is configured to hold the lead wires 67 in a bent fashion and to lead them out. The mounting hole 62b partially overlaps with the lead-out region 62c in an area extending along the axial center of the securing member 55, but is located below (i.e., dislocated from) the lead wires 67. The fixing hole 62a is located farther downward than the mounting hole 62b.

The spacer 62 is also composed of a pair of split parts 63 and 64 (a first split part 63 and a second split part 64) which are split up in halves in a direction which extends perpendicularly to the axis of the inner member 22 and along the axial center C3 of the mounting hole 40a. The split parts 63 and 64 hold there between the lead wires 67. Parting planes 63b and 64b of the split parts 63 and 64 are formed at such a position as to split the fixing hole 62a and lead-out region 62c in halves.

The first split part 63 is formed into a generally semicylinder with a projecting region 63g which protrudes out of a side edge of the parting plane 63b to form the lead-out region 62c. A sunken region 63a is formed on the top of the first split part 63 for receiving the projecting region 60c of the cap 60. A housing recessed region 63c is formed on the parting plane 63b in such a manner as to extend from the sunken region 63a to the projecting region 63g for housing the lead wires 67. At an end region of the housing recessed region 63c in a vicinity of the sunken region 63a is a projecting region 63d to be inserted into a recessed region 64a of the second split part 64, and in a vicinity of the projecting region 63g to form the lead-out region 62c in the housing recessed region 63c, there is formed a partition wall 63e to separate the lead wires 67. There is formed, on the parting plane 63b, a retaining hole 63f for receiving a retaining hook 64c of the second split part 64 in a vicinity of the partition wall 63e and on both sides of the housing recessed region 63c. A through hole 63h for forming the mounting hole 62b is formed in a vicinity of a bent region of the housing recessed region 63c on the parting plane 63b in such a manner as to go through the first split part 63. Below the through hole 63h is a recessed region 63j for forming the fixing hole 62a. The recessed region 63j is recessed with respect to the parting plane 63b in a semicylindrical fashion, and is provided with a retaining hole 63i, on the edge facing toward the projecting region 63g, for receiving a retaining hook 64g of the second split part 64. Further, there is formed, at the bottom of the first split part 63, a fit recess 63k which is recessed with respect to the parting plane 63b.

The second split part 64 is formed into a generally semicylinder with a projecting region 64d which protrudes out of a side edge of the parting plane 64b to form the lead-out region 62c. A sunken region 64a is formed on the top of the second split part 64 for receiving the projecting region 60c of the cap 60 and the projecting region 63d of the first split part 63. A retaining hook 64c is formed at each of opposite edges of the parting plane 64b and in a vicinity of the sunken region 64a to be inserted into the retaining hole 63f of the first split part 63. The projecting region 64d for forming the lead-out region 62c is provided with a housing recessed region 64e for housing the lead wires 67. The housing recessed region 64e is formed in such a manner as to be continuous with the parting plane 64b. In a vicinity of the projecting region 64d, there are formed a through hole 64f which goes through the second split part 64 for forming the mounting hole 62b in combination with the through hole 63h of the first split part 63, and a retaining hook 64g engageable with the retaining hole 63i of the first split part 63. Below the through hole 64f is a recessed region 64h for forming the fixing hole 62a. The recessed region 64h is recessed with respect to the parting plane 64b in a semicylindrical fashion. Further, at the bottom of the second split part 64 is a fit projection 64i which protrudes out of the parting plane 64b to be fitted in the fit recess 63k of the first split part 63.

To assemble the spacer 62, the lead wires 67 are firstly stored in the housing recessed regions 63c and 64e of the split parts 63 and 64. Then the first split part 63 and second split part 64 are integrated by mating the parting planes 63b and 64b, while the retaining hooks 64c and 64g and retaining holes 63f and 63i are fastened together. Thus the spacer 62 is provided.

Then, assembling of the securing member 55 is started by assembling of the connector 56, by having the retaining hooks 58e be engaged with the retaining regions 57e to mate the split parts 57 and 58 while sandwiching the pin sockets 66 connected with the lead wires 67 with the aid of the support member 68. Then the fitting region 56c disposed at the bottom of the connector 56 is fitted inside the circumferential wall 60d of the cap 60. The lead wires 67 have been passed through the through holes 60b of the cap 60 before mating the split parts 57 and 58. Then the spacer 62 is assembled by mating the split parts 63 and 64 while setting the projecting region 60c disposed at the bottom of the cap 60 in the sunken regions 63a and 64a and sandwiching the lead wires 67. Thus the securing member 55 is completed.

Thereafter, the gas generator 52 is assembled with the securing member 55 by inserting the terminal pins 52d into the pin sockets 66 via the assembling holes 56a of the connector 56, thus forming an assembled module 69 as shown in FIG. 11. Then the assembled module 69 is inserted into the inner case 23 via the root end region 39 of the inner case 23 until the flange region 52c of the gas generator 52 abuts against the step 38 of the inner case 23 such that the lead-out region 62c of the spacer 62 fits in the housing recess 42 of the inner case 23. Thus the fixing hole 62a of the securing member 55 and the fixing hole 41 of the inner case 41 coincide so as to allow the rivet 44 there through. If then the rivet 44 is fastened to the inner case 23, the securing member 55 is undetachably assembled with the inner case 23 and the gas generator 52 is secured to a predetermined position inside the case 23.

Figure 8:
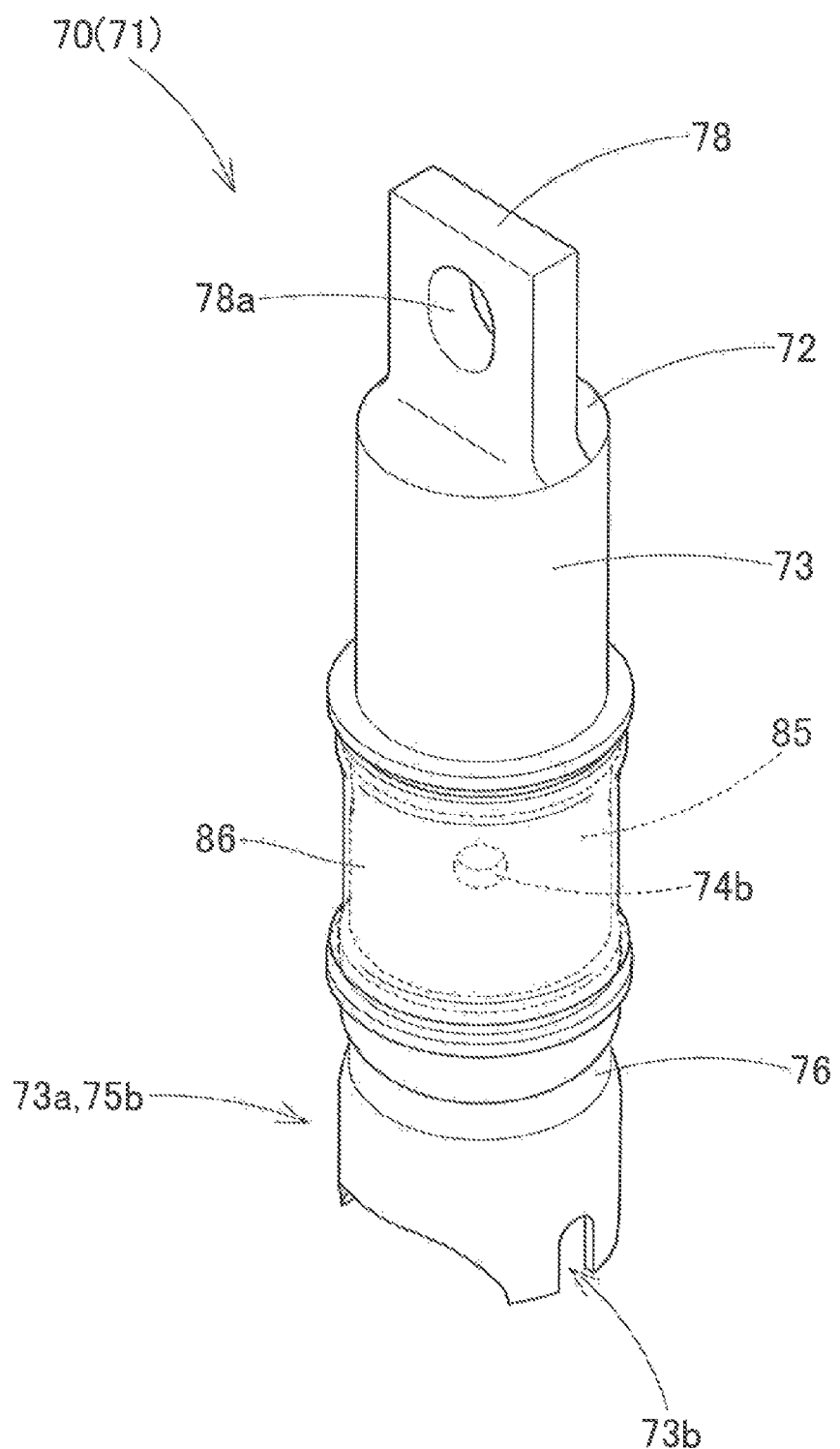
FIG. 8 is a schematic perspective view of an outer member of the actuator.

Referring to FIGS. 3, 4 and 8, the outer member 70 of the actuator 21 is made from such metal as steel and includes a ceiling wall 72 which covers the opening 25a disposed at the leading end region 24 of the inner member 22 (or inner case 23) and a generally tubular circumferential wall 73 which extends from the outer peripheral edge of the ceiling wall 72 downwardly in FIGS. 3 and 4, i.e. in a direction to cover an outer circumference of the inner member 22 up to a vicinity of the mounting hole 40a. That is, the circumferential wall 73 covers an area where the gas generator 52 is stored.

The outer member 70 of the illustrated embodiment is composed of a main body 71 and a holder region 80 which is made from such metal as steel and provided separate from the main body 71. The holder region 80 is secured to an inner circumference of the end 73a region of the circumferential wall 73, which is remote from the ceiling wall 72, by swaging.

The outer member 70 further includes a connecting region 78 to be connected to the mounting plate 15 of the hinge mechanism 11. The connecting region 78 includes a round connecting hole 78a and protrudes out of the top plane of the ceiling wall 72 of the main body 71. That is, the connecting region 78 is disposed on an opposite side to the circumferential wall 73 with respect to the ceiling wall 72. The connecting region 78 is pivotally coupled to the mounting region 15a of the mounting plate 15 (i.e., to the second mounting region) with the aid of a pivot member (pivot pin or pivot bolt) 19 which is inserted into the connecting hole 78a. The pivot member 19 put through the connecting hole 78a is fastened with a nut 17. Thus the connecting region 78 is The circumferential wall 73 includes a sliding region 74 and an enlarged diameter region 75 which has a greater inner diameter than the sliding region 74 and is disposed in a vicinity of the end 73a of the circumferential wall 73.

An inner circumferential plane 74b of the sliding region 74 is configured slidable against the sealing member 46 of the inner member 22 while retaining gas sealing property when the actuator 21 is actuated. To this end, the inner circumferential plane 74b is formed into a smooth circular arc face which is concentric to the axial center C0 of the actuator 21 (i.e., to the central axis C0 of movement of the outer member 70).

As described above, the holder region 80 is secured to an inner circumference of the enlarged diameter region 75 by swaging, in such a manner as to reduce a substantial inner diameter of the enlarged diameter region 75. A step plane 75a formed between the sliding region 74 and enlarged diameter region 75 serves to determine the locking position of the outer member 70 at which the outer member 70 having been completely deployed is stopped from retracting. To this end, the enlarged diameter region 75 is located at such a position as to correspond to the desired locking position of the outer member 70.

Figure 7:
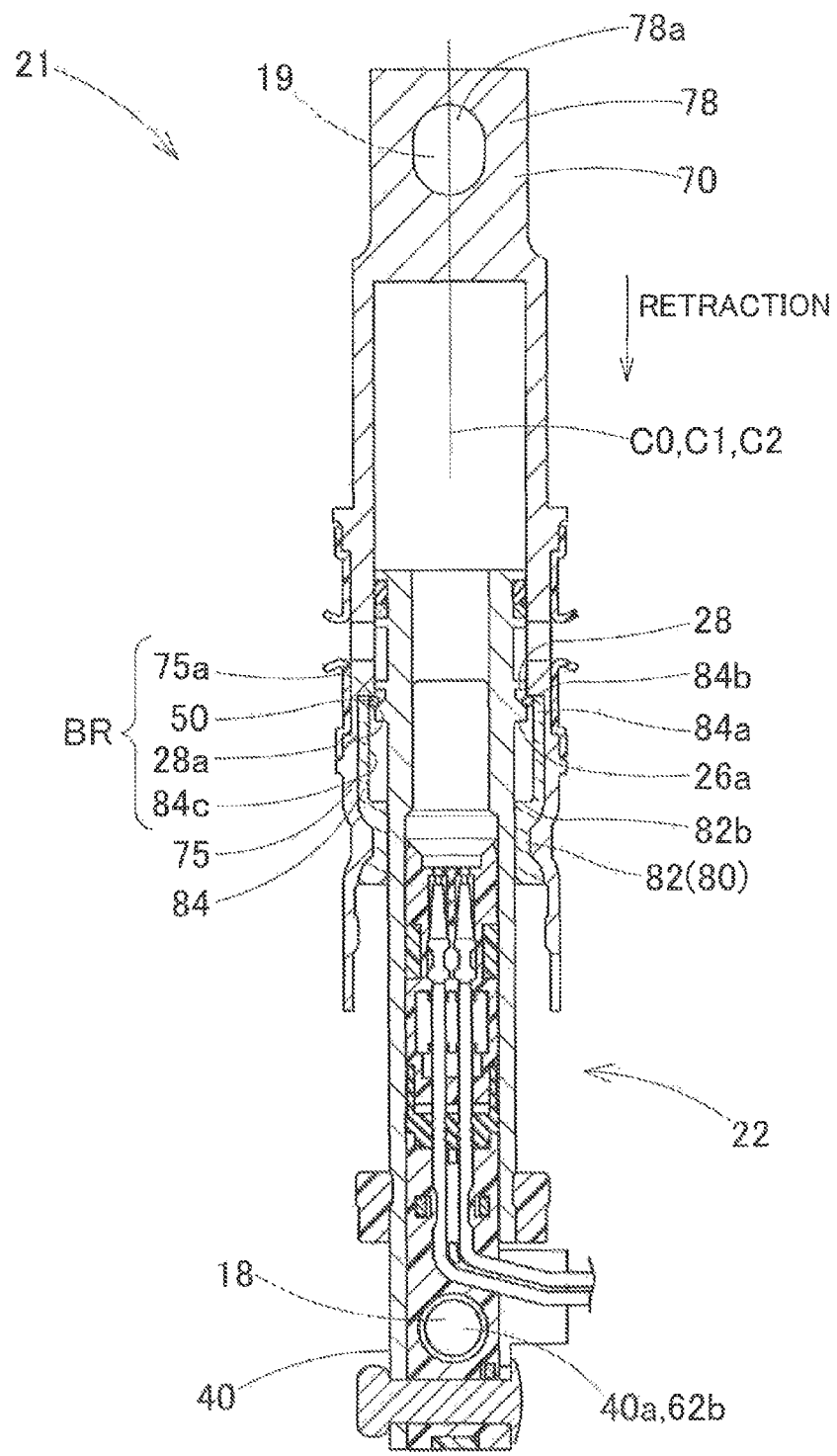
FIG. 7 is a schematic vertical section of the actuator in which the deploying section is locked at the locking position after deployment.

Here, the operation and effects of the retraction-preventing lock mechanism BR is briefly described. As described above, if the lock ring 50 having been stored in the storage groove 28 of the inner case 23 is radially outwardly expanded at deployment of the outer member 70 and sandwiched between the step plane 75a of the enlarged diameter region 75 and the slope restricting plane 28a of the storage groove 28 as shown in FIG. 7, the outer member 70 is stopped from retracting, such that the actuator 21 will keep lifting the rear end region 10c of the hood 10 such that the deformation space S between the hood 10 and the engine room ER is maintained.

The holder region 80 is made from such metal as steel into a generally cylindrical shape, as described above. The holder region 80 is secured to the inner circumference of the end region of the enlarged diameter region 75 of the circumferential wall 73 by swaging. The holder region 80 includes a sliding region 82 and an extended region 84 which extends towards the ceiling wall 72 from the sliding region 82 and has a greater inner diameter than the sliding region 82. The sliding region 82 includes, on the outer circumference, a recessed region 81 used at swaging.

The sliding region 82 is generally cylindrical in shape. An inner circumferential plane 82a of the sliding region 82 is formed into a smooth circular arc face concentric to the axial center C2 of the outer member 70, and is slidable against the sliding region 36 of the outer circumferential plane 23a of the inner member 22 so as to guide the deployment of the outer member 70 along the axial center C0 of the actuator 21. The sliding region 82 has an inner diameter slightly greater than the outer diameter of the inner member 22 so as to be slidable against the sliding region 36 of the inner member 22.

A leading end plane 82b of the sliding region 82 facing towards the extended region 84 abuts against the flange-like projecting region 26 (i.e., stopper) of the inner member 22 when the outer member 70 is completely deployed, as shown in FIG. 6.

The extended region 84 of the holder region 80 extends towards the ceiling wall 72 until the leading end 84a is brought into contact with the step plane 75a of the enlarged diameter region 75 of the circumferential wall 73. The inner diameter of the extended region 84 is determined such that the lock ring 50 is sandwiched between the step plane 75a of the enlarged diameter region 75 and the slope restricting plane 28a of the storage groove 28 of the inner case 23 as shown in FIG. 7 and the retraction-preventing lock mechanism BR functions when the outer member 70 moves backward after having been completely deployed.

The outer member 70 is further provided with a retaining groove 77 on an inner circumference of the end region 75b of the enlarged diameter region 75, which is remote from the ceiling wall 72. Before the actuator 21 is actuated, the retaining groove 77 is located at a position coincident with the retaining groove 43 formed on the outer circumference of the inner case 23 of the inner member 22. The retaining ring 48 is fitted in the retaining grooves 77 and 43.

Retained in the retaining groove 43 of the inner member 22, the retaining ring 48 retains the retaining groove 77 of the outer member 70 and prevents an inadvertent extension of the actuator 21 before being actuated. Unless the actuator 21 is elongated, the hinge arm 14 will not rotate about the mounting plate 15, such that the hood 10 can be opened and closed with respect to the support shafts 13 for normal use. When the actuator 21 is actuated, as shown in FIG. 5, the retaining ring 48 stays retained in the retaining groove 43 of the inner member 22 but is disengaged from the retaining groove 77 of the outer member 70, thus allowing a deployment of the outer member 70.

The retaining ring 48 also secures waterproof property between the outer member 70 and inner member 22 and shuts out foreign particles.

Furthermore, the outer member 70 includes a plurality of exhaust holes 74b each of which goes through the circumferential wall 73 at a region of the sliding region 74 in a vicinity of the enlarged diameter region 75. On the outer circumference of an area where the exhaust holes 74b are formed, there is formed an assembling sunken region 85 around which a later-described cover member 86, which is a tube-shaped member formed of a heat-shrinkable sheet or the like, is mounted.

The cover member 86 is configured to rupture due to heat and pressure of the actuating gas G when the actuator 21 is actuated and moves the outer member 70 to such a position that the exhaust holes 74b are disposed above the leading end region 24 of the inner member 22 as shown in FIG. 6. More specifically, when the actuator 21 is actuated, the actuating gas G fills a gas chamber 91, which is defined by the ceiling wall 72 of the outer member 70, a region of the circumferential wall 73 of the outer member 70 ranging from the ceiling wall 72 to a region in contact with the sealing member 46 of the flange-like projecting region 26 of the inner member 22, and the leading end region 24 of the inner member 26. When this gas chamber 91 is brought into communication with the exhaust holes 74b, the cover member 86 ruptures with the actuating gas G emitted out of the exhaust holes 74b. If the cover member 86 ruptures, an extra actuating gas G is exhausted out of the exhaust holes 74b and the thrust of the actuator 21 is reduced, such that the rear end 10c of the hood 10 is prevented from bounding. As a consequence, the actuators 21 are capable of supporting and locking the rear end 10c of the hood 10 in a steady fashion at the position corresponding to the lock ring 50 locked at the locking position.

To mount the hood lifting device U employing the actuators 21 on the vehicle V, the lead wires 67 are firstly connected to the not-shown control circuit. The connecting regions 40 and 78 of each of the actuators 21 are jointed to the mounting region 14c of the hinge arm 14 and to the mounting region 15a of the mounting plate 15 with the pivot members 18 and 19 in each of the hinge mechanisms 11 located at the left and right of the hood 10. Thus the actuators 21 are mounted on the hinge mechanisms 11 and the hood lifting device U is mounted on the vehicle V.

If the actuators 21 are actuated after the hood lifting device U is mounted on a vehicle V, each of the gas generators 52 generates an actuating gas G. The gas G fills the gas chamber 91, which is defined by the ceiling wall 72 of the outer member 70, the region of the circumferential wall 73 of the outer member 70 ranging from the ceiling wall 72 to the region in contact with the sealing member 46 of the flange-like projecting region 26 of the inner member 22, and the leading end region 24 of the inner member 22, and the ceiling wall 72 is subjected to the pressure of the actuating gas G, thus the outer member 70 moves forward relative to the inner member 22, as shown in (B) of FIG. 2 with double-dotted lines to solid lines, or as shown in FIGS. 4 and 6. At this time, the retaining ring 48 is disengaged from the retaining groove 77 of the outer member 70, and the inner circumferential plane 74a of the circumferential wall 73 of the outer member 70 and the sealing member 46 of the flange-like projecting region 26 of the inner member 22 slide against each other while the sliding region 82 of the holder region 80 of the outer member 70 and the sliding region 36 on the outer circumference of the inner member 22 slide against each other, thus the actuator 21 is elongated. If each of the actuators 21 is elongated, the intersection angle θ0 (see (B) of FIG. 2) between the hinge arm 14 and mounting plate 15 is increased, such that the hood 10 is lifted at the rear end 10c and an ample deformation space S is provided beneath the hood 10. As a consequence, the hood 10 will be more deformable and capable of receiving a pedestrian with a reduced impact. In the meantime, the actuating gas G is exhausted out of the exhaust holes 74b due to rupturing of the cover member 86.

Thereafter, as shown in FIG. 6, the outer member 70 of each of the actuators 21 stops deployment when the leading end plane 82b of the sliding region 82 of the holder region 80 abuts against the stopping plane 26a of the flange-like projecting region 26 of the inner member 22. Then the outer member 70 retracts, while supporting the hood 10, in such a manner as to make the lock ring 50, which has been radially outwardly expanded, slide on the inner circumferential plane 84c of the extended region 84 of the holder region 80 of the outer member 70, as shown in FIGS. 6 and 7. The lock ring 50 then bumps against the step plane 75a of the enlarged diameter region 75 of the outer member 70. At this time, the upper plane of the lock ring 50 is in contact with the step plane 75a while the lower plane in contact with the slope restricting plane 28a of the storage groove 28 of the inner member 22. That is, the lock ring 50 is held from moving both in advancing and retracting direction of the outer member 70 along the axial center CO of the actuator 21. Also in both radially outward and inward directions, the lock ring 50 is locked by the inner circumferential plane 84c of the extended region 84 of the holder region 80 and the slope restricting plane 28a of the storage groove 28. That is, the lock ring 50 is prevented from moving upwardly or downwardly while being prevented from being deformed in a direction perpendicular to the axial enter CO of the actuator 21. Accordingly, the outer member 70 of each of the actuators 21 is prevented from retracting and the actuators 21 keep the rear end 10c of the hood 10 lifted.

As a consequence, the hood lifting device U is capable of keeping the rear end 10c of the hood 10 at the lifted position even after operation so that a predetermined deformation space S is kept beneath the hood 10. Thus, in the event that a pedestrian impacts against the rear end 10c of the hood 10 after operation of the hood lifting device U, the rear end 10c region of the hood 10 will be allowed a certain amount of plastic deformation for absorbing the kinetic energy of the pedestrian.

When the actuator 21 of the illustrated embodiment is actuated and the outer member (or deploying section) 70 is deployed and move the second mounting region 15a away from the first mounting region 14c as shown in FIGS. 3 to 5, the securing member 55 of the inner member (or housing section) 22, which supports the gas generator 52, is pressed in a direction opposite to the deploying direction of the deploying section 70, i.e., in a disengaging direction from the inner case 23, due to a reaction force of the driving force, i.e., due to a pressure of the actuating gas G. At this time, since the securing member 55 is integrally fixed to the inner case 23 with the fixing member 44 put through the fixing hole 41 of the inner case 23 and fixing hole 62a of the securing member 55, the securing member 55 presses the inner case 23 through the medium of the fixing member 44 in the direction opposite to the deploying direction of the deploying section 70 (i.e., in a retracting direction), and a region 40c of the inner circumferential plane 40b of the mounting hole 40a of the inner case 23 disposed towards the deploying direction of the deploying section 70 is brought into direct contact with the pivot member 18, such that the inner case 23 presses the pivot member 18. That is, due to the direct contact between the pivot member 18 and the region 40c of the inner circumferential plane 40b of the mounting hole 40a of the inner case 23 disposed towards the deploying direction of the deploying section 70, the housing section 22 is supported by the pivot member 18 in such a manner as to receive a reaction force. In comparison with a conventional configuration of like actuator in which a collar is disposed between the pivot member and housing section, this configuration will improve a joint strength between the pivot member 18 and housing section 22 and steady the deployment of the deploying section 70.

Therefore, the actuator 21 of the illustrated embodiment has an improved joint strength between the housing section (inner member) 22, in which a driving source is stored, and the pivot member 18 which mounts the housing section 22 on a predetermined mounting region 14c, with a simple configuration that the inner case 23 and securing member 55 are integrated with the fixing member 44 such that the inner circumferential plane 40b of the mounting hole 40a of the inner case 23 of metal is in direct contact with the pivot member 18.

In the actuator 21 of the foregoing embodiment, the axial center C3 of the mounting holes 40a and 62b and the axial center C4 of the fixing holes 41 and 62a are orthogonal when projected on a plane perpendicular to the axial center C0 of the actuator 21 (i.e., the axial center C1 of the inner member 22). In other words, the axial center C3 of the mounting holes 40a and 62b and the axial center C4 of the fixing holes 41 and 62a are skew lines forming 90 degree angle.

This configuration forms a certain distance between a periphery of the mounting holes 40a and 62b and a periphery of the fixing holes 41 and 62a although the mounting holes 40a and 62b and the fixing holes 41 and 62a are disposed close to each other, thus helps suppress strength deterioration of the inner case 23 and securing member 55. In other words, the configuration of the illustrated embodiment enables the mounting holes 40a and 62b (i.e., the pivot member 18) and fixing holes 41 and 62a (i.e., the fixing member 44) to be disposed close to each other with less fear of strength deterioration, especially when a space is limited.

In the illustrated embodiment, the driving source includes the gas generator 52 which, when actuated, generates an actuating gas G composed of a combustion gas. The deploying section (outer member) 70 and the housing section (inner member) 22 are configured to slide against each other, and form, there between, the gas chamber 91 filled with the actuating gas G when the actuator 21 is actuated. Further, the deploying section (outer member) 70 includes:

the ceiling wall 72, i.e. a pressured region, which is subjected to a pressure of the actuating gas G in the gas chamber 91;

the circumferential wall 73, i.e. the sliding region 74, which adjoins the ceiling wall (pressured region) 72 and is slidable against the sealing member 46, a constituent of the gas chamber 91 on the part of the housing section 22; and the connecting region 78 which is adapted to be mounted on the second mounting region 15a, and adjoins the ceiling wall (pressured region) 72 on an opposite side to the circumferential wall (sliding region) 73 with respect to the ceiling wall (pressured region) 72.

Compared with such an instance that a spring, which would exert a mechanical biasing force, is employed as the driving source, the gas generator 52 of the illustrated embodiment fills the gas chamber 91 instantly and moves the deploying section (outer member) 70 quickly to move the second mounting region 15a away from the first mounting region 14c by making a gas pressure act on the ceiling wall (pressured region) 72 such that the circumferential wall 73 of the outer member 70 slides against the sealing member 46 and the connecting region 78 mounted on the second mounting region 15a moves.

If such an advantageous effect does not have to be considered, the actuator may be configured to include a spring as the driving source such that a restoring force of the spring after having been elastically deformed is used as a driving force to deploy the deploying section.

In the actuator 21 of the illustrated embodiment, the securing member 55 includes the connector 56 to be connected to the terminal pins (i.e. the signal input region) 52d of the gas generator 52 and the spacer 62 which supports the connector 56. The connector 56 is composed of a pair of split parts 57 and 58 that are split in a direction C1V perpendicular to the axial center C1 of the inner case 23 and stored in and secured to the inner case 23 in an integrated state. The connector 56 holds the sockets (pin sockets) 66 for receiving the terminal pins (i.e. the signal input region) 52d of the gas generator 52 between the split parts 57 and 58. The spacer 62 is also composed of a pair of split parts 63 and 64 that are split in a direction C1V perpendicular to the axial center C1 of the inner case 23 and stored in and secured to the inner case 23 in an integrated state. The spacer 62 holds the lead wires 67 extending from the socket 66 between the split parts 63 and 64. Further, the mounting holes 40a and 62b and the fixing holes 41 and 62a of the housing section (inner member) 22 are disposed at a position farther away from the deploying direction of the deploying section (outer member) 70 than the location of the lead wire 67 held by the spacer 62 (i.e. at a region in a vicinity of the end plane 39a of the root end region 39 of the inner case 23). The securing member 55 with such a configuration can be assembled by disposing the sockets 66 and lead wires 67 extending from the sockets 66 between the split parts 57 and 58 and split parts 63 and 64 and mating the split parts 57 and 58 and split parts 63 and 64. Then if the gas generator 52 is connected to the connector 56, an assembled module 69 is formed. If this assembled module 69 is set inside the inner case 23, and the fixing member 44 is fitted through the fixing holes 41 and 62a, the housing section (inner member) 22 is completed. Unlike a conventional securing member which is integrally molded with a gas generator, this configuration will enable the gas generator 52 to be stored in a separate place from the securing member 55 until the assembling of the inner member 22, which is more preferable for a storage of the gas generator 52 which can generate a combustion gas. The configuration of the illustrated embodiment will further facilitate a change of location of the gas generator 52 inside the housing section (inner member) 22, i.e., a change of initial volume of the gas chamber 91. That is, the location of the gas generator 52 inside the housing section 22 can be easily changed only by changing the length of the spacer 62 in a direction of the axial center C1 of the spacer 62, without using a mold used to mold a conventional securing member, which will make it easy to adapt to a power change of the actuator 21.

Of course, in order to adjust the length of the spacer 62 in the direction of the axial center C1 of the spacer 62 for changing the initial volume of the gas chamber 91, it is required to change the position of the step 38 of the inner case 23 to position the flange region 52c of the gas generator 52 even with the above configuration. However, other changes than the change of position of the step 38 will be easily made only by adjusting of the length of the spacer. Therefore, the above configuration will be more advantageous than the conventional configuration using a mold.

Moreover, since the mounting holes 40a and 62b and the fixing holes 41 and 62a of the housing section (inner member) 22 are disposed at the position farther away from the deploying direction of the deploying section (outer member) 70 than the location of the lead wires 67 held by the spacer 62 (i.e. at the region in a vicinity of the end plane 39a of the root end region 39 of the inner case 23), there is no hollow region extending along the axial center C1 of the housing section 22 for storing the lead wires 67 in a vicinity of the mounting holes 40a and 62b and the fixing holes 41 and 62a. Instead a solid region 62e with a certain thickness is disposed in the vicinity of the mounting holes 40a and 62b and the fixing holes 41 and 62a in the spacer 62, as shown in FIGS. 3 to 5. The solid region 62e will help maintain the strength of the spacer 62 in the vicinity of the mounting holes 40a and 62b and the fixing holes 41 and 62a.

In the actuator 21 of the illustrated embodiment, furthermore, the case of the housing section (or inner member) 22 is composed of the inner case 23 that is generally tubular in shape and is provided, at the leading end region 24, the opening 25a for releasing the actuating gas G generated by the gas generator 52. The securing member 55 is disposed in and secured to the inner case 23, and supports the gas generator 52 such that the leading end of the gas generator 52 faces towards the opening 25a of the inner case 23. The deploying section (or outer member) 70 includes the ceiling wall 72 that covers the opening 25a of the inner case 23 and serves as the pressured region, and the circumferential wall 73 that extends from the outer peripheral edge of the ceiling wall 72 in such a manner as to cover the outer circumference of the inner case 23, such that the deploying section 70 is so deployable as to move relative to the inner case 23 when pressed by the actuating gas G generated by the gas generator 52. The inner case 23 further includes the flange-like projecting region 26 that projects out of the outer circumference of the leading end region 24 and is provided with the sealing member 46 slidable against the inner circumferential plane 74a of the circumferential wall 73 of the deploying section 70. The deploying section 70 further includes, on the inner circumference of the end region 73a of the circumferential wall 73 remote from the ceiling wall 72, the holder region 80 that projects inward so as to be slidable against the sliding region 36 of the outer circumference of the inner case 23 except the flange-like projecting region 26 and prevents the deploying section 70 from being disengaged from the housing section 22 by abutting against the flange-like projecting region 26.

With this configuration, when the gas generator 52 is actuated and produces an actuating gas G, the gas G fills the gas chamber 91, which is defined by the ceiling wall 72 of the deploying section (outer member) 70, the region of the circumferential wall 73 of the deploying section 70 ranging from the ceiling wall 72 to the region in contact with the sealing member 46 of the flange-like projecting region 26 of the housing section 22, and the leading end region 24 of the inner case 23, and the ceiling wall 72 is subjected to the pressure of the actuating gas G, thus the deploying section (outer member) 70 moves forward relative to the housing section (inner member) 22. When the deploying section (outer member) 70 is deployed, the inner circumferential plane 74a of the circumferential wall 73 of the deploying section (outer member) 70 and the sealing member 46 of the flange-like projecting region 26 of the housing section (inner member) 22 slide against each other while the holder region 80 of the deploying section (outer member) 70 and the sliding region 36 on the outer circumference of the housing section (inner member) 22 slide against each other, and the deploying section 70 moves smoothly until the actuator 21 reaches its maximum length, i.e. until the holder region 80 abuts against the flange-like projecting region 26. This configuration contributes to lengthen an amount of deployment stroke of the actuator 21 because the deploying section (outer member) 70 is configured such that the circumferential wall 73 extends farther towards the first mounting region 14c than the location of the gas generator 52 so the holder region 80 of the deploying section (outer member) 70 can slide on the outer circumferential plane 23a of the housing section (inner member) 22 at the location of the gas generator 52.

If such an advantageous effect does not have to be considered, the actuator may be configured into a piston-cylinder type actuator which would be composed of a cylinder which holds a gas generator therein and a piston rod housed inside the cylinder. In this instance, the cylinder (i.e. outer member) acts as the housing section while the piston rod (i.e. inner member) acts as the deploying section.

In the actuator 21 of the illustrated embodiment, furthermore, the spacer 62 of the securing member 55 of the housing section 22 includes the lead-out region 62c that holds the lead wires 67 in a bent fashion in a direction generally perpendicular to the axial center C1 of the inner case 23 and leads the lead wires 67 out of the housing section 22. The deploying section (outer member) 70 further includes, at the leading end edge of the circumferential wall 73 remote from the ceiling wall 72, the fitting recessed region 73b in which the lead-out region 62c of the spacer 62 is fitted.

With this configuration, since the lead-out region 62c of the spacer 62 of the housing section 22 is fitted in the fitting recessed region 73b of the deploying section 70, the lead-out region 62c holds the deploying section 70 from rotating in a circumferential direction, i.e., positions the deploying section 70 with respect to the housing section 22, such that the direction along which the deploying section 70 is mounted on the second mounting region 15a (in other words, the axial direction of the connecting hole 78a of the connecting region 78) is steadied against the axial direction of the mounting hole 22b (40a) of the housing section 22, thereby facilitating the mounting work of the actuator 21 on the first mounting region 14c and second mounting region 15a.

Although the rivet 44 is employed as the fixing member to be put through the fixing holes 41 and 62a and secure the securing member 55 to the inner case 23 in the foregoing embodiment, the rivet may be replaced by a bolt, a pin or the like.

Although the actuator 21 of the foregoing embodiment has been described as is used in the hood lifting device U which lifts the vehicle hood 10, the application of the present invention should not be limited thereby. By way of example, the actuator of the invention may be used in a head protection device mountable on a head rest of a vehicle, which head rest being composed of a front region and a rear region, so as to deploy the front region forward in the event of an impact of the vehicle. The invention may also be applied to such an actuator that the housing section and the deploying section are each jointed to a knee-cushioning panel and the vehicle body structure located in front of the driver's seat, such that the actuator deploys the knee-cushioning panel rearward in the event of a frontal collision of a vehicle. Furthermore, the actuator of the present invention may be employed in various safety devices for a vehicle using a function of the actuator which is operable with such a driving source as a gas generator or a spring to move the deploying section relative to the housing section at a predetermined timing.

What is claimed is:

1. An actuator which is adapted to be mounted on a first mounting region and on a second mounting region so as to be operable to separate the second mounting region from the first mounting region, the actuator comprising a housing section that houses a driving source and is adapted to be mounted on the first mounting region and a deploying section that is adapted to be mounted on the second mounting region and deployable, when pressed by a driving force of the driving source, in such a fashion as to move forward relative to the housing section and to separate the second mounting region from the first mounting region, the housing section comprising:
   a case that is tubular and formed from metal;
   a securing member that is disposed inside the case and secured to the case for supporting the driving source;
   a mounting hole that is used to mount the housing section on the first mounting region, the mounting hole being formed through the case and securing member in a direction perpendicular to an axial center of the case for receiving a pivot member connected to the first mounting region, the mounting hole being formed at a root end region of the housing section which root end region being disposed on an opposite side to a deploying direction of the deploying section with respect to the driving source, wherein an inner circumferential plane of the mounting hole of the case is configured to be brought into contact with the pivot member at least on a region thereof disposed towards the deploying direction of the deploying section when the actuator is actuated; and
   a fixing hole for receiving a fixing member that fixes the securing member to the case and prevents disengagement of the securing member from the case in an opposite direction to the deploying direction of the deploying section, the fixing hole being formed through the case and the securing member in a direction perpendicular to the axial center of the case and disposed at a different position from the mounting hole in the root end region of the housing section.

2. The actuator as set forth in claim 1, wherein an axial center of the mounting hole and an axial center of the fixing hole are orthogonal when projected on a plane perpendicular to an axial center of the actuator.

3. The actuator as set forth in claim 1, wherein:
   the driving source includes a gas generator which, when actuated, generates an actuating gas composed of a combustion gas;
   the housing section and the deploying section are configured to slide against each other and form, there between, a gas chamber filled with the actuating gas when the actuator is actuated; and
   the deploying section comprises:
      a pressured region that is subjected to a pressure of the actuating gas in the gas chamber;
      a sliding region that adjoins the pressured region and is slidable against a constituent of the gas chamber on the part of the housing section; and
      a connecting region that is adapted to be mounted on the second mounting region, the connecting region adjoining the pressured region on an opposite side to the sliding region with respect to the pressured region.

4. The actuator as set forth in claim 3, wherein:

the securing member includes a connector to be connected to a signal input region of the gas generator and a spacer that supports the connector;

the connector is composed of a pair of split parts that are split in a direction perpendicular to the axial center of the case and stored in and secured to the case in an integrated state;

the connector holds a socket for receiving the signal input region of the gas generator between the split parts;

the spacer is composed of a pair of split parts that are split in a direction perpendicular to the axial center of the case and stored in and secured to the case in an integrated state;

the spacer holds a lead wire extending from the socket between the split parts; and the mounting hole and fixing hole of the housing section are disposed at a position farther away from the deploying direction of the deploying section than the lead wire held by the spacer.

5. The actuator as set forth in claim 4, wherein:

the case of the housing section is composed of an inner case that is generally tubular in shape and is provided, at a leading end region thereof, an opening for releasing the actuating gas generated by the gas generator;

the securing member supports the gas generator in such a manner that a leading end of the gas generator for emitting the actuating gas faces towards the leading end region of the inner case;

the deploying section comprises a ceiling wall that covers the opening of the inner case and serves as the pressured region and a circumferential wall that extends from an outer peripheral edge of the ceiling wall in such a manner as to cover an outer circumference of the inner case, such that the deploying section is so deployable as to move relative to the housing section when the ceiling wall is pressed by the actuating gas;

the inner case further includes a flange-like projecting region that projects out of an outer circumference of the leading end region of the inner case and is provided with a sealing member slidable against an inner circumferential plane of the circumferential wall of the deploying section; and the deploying section further includes, on an inner circumference of an end region of the circumferential wall remote from the ceiling wall, a holder region that projects inward so as to be slidable against a region of the outer circumference of the inner case except the flange-like projecting region and prevents the deploying section from being disengaged from the housing section when abutting against the flange-like projecting region.

6. The actuator as set forth in claim 5, wherein:

the spacer of the securing member of the housing section includes a lead-out region that holds the lead wire in a bent fashion in a direction generally perpendicular to an axial center of the inner case and leads them out of the housing section; and the deploying section further includes, at an end edge of the circumferential wall remote from the ceiling wall, a fitting recessed region in which the lead-out region of the spacer is fitted.

7. The actuator as set forth in claim 1, wherein the actuator is configured to be employed in a hood lifting device that moves the second mounting region away from the first mounting region for lifting a rear end region of a hood of a vehicle, wherein the housing section is mounted on the first mounting region disposed on the part of a body structure of the vehicle beneath the rear end region of the hood while the deploying section is mounted on the second mounting region disposed at the rear end region of the hood.

* * * * *